(12) United States Patent
Ono

(10) Patent No.: US 9,086,803 B2
(45) Date of Patent: Jul. 21, 2015

(54) CHANGING CORRESPONDENCE AMONG CONTROL DEVICES AND MEMORIES BASED ON MEMORY ACCESS FREQUENCIES

(71) Applicant: FUJITSU LIMITED, Kawasaki-shi, Kanagawa (JP)

(72) Inventor: Takatsugu Ono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 319 days.

(21) Appl. No.: 13/783,853

(22) Filed: Mar. 4, 2013

(65) Prior Publication Data

US 2013/0246718 A1 Sep. 19, 2013

(30) Foreign Application Priority Data

Mar. 19, 2012 (JP) ................................. 2012-062827

(51) Int. Cl.
*G06F 9/50* (2006.01)
*G06F 3/06* (2006.01)

(52) U.S. Cl.
CPC ............ *G06F 3/0604* (2013.01); *G06F 3/0659* (2013.01); *G06F 3/0683* (2013.01); *G06F 9/5016* (2013.01); *G06F 9/5033* (2013.01); *G06F 2206/1012* (2013.01)

(58) Field of Classification Search
CPC ..... G06F 9/5033; G06F 9/505; G06F 9/5027; G06F 11/3433; G06F 11/3485; G06F 12/0653; G06F 12/0873; G06F 13/362; G06F 2212/263; G06F 2209/5022
See application file for complete search history.

(56) References Cited

U.S. PATENT DOCUMENTS

| 7,089,281 B1* | 8/2006 | Kazemi et al. ................ 709/203 |
| 2005/0267929 A1* | 12/2005 | Kitamura ....................... 709/201 |
| 2005/0278387 A1 | 12/2005 | Kamada et al. |

FOREIGN PATENT DOCUMENTS

| JP | 6-103307 | 4/1994 |
| JP | 2005-339236 | 12/2005 |

* cited by examiner

*Primary Examiner* — Hal Schnee
(74) *Attorney, Agent, or Firm* — Staas & Halsey LLP

(57) ABSTRACT

A control device includes a storage to store correspondence information indicating a correspondence between each of memories and each of information processing devices; and a processor to execute an operation including: detecting a first memory from among the memories, the first memory being a memory whose access frequency exceeds a predetermined access frequency or is relatively high, and a second memory being a memory whose access frequency is lower than or equal to a predetermined access frequency, changing the correspondence information so that an information processing device corresponding to the first memory changes from a first information processing device to a second information processing device corresponding to the second memory, and notifying a management device of the changed correspondence information, and outputting data read from the first memory to the management device via the second information processing device.

7 Claims, 23 Drawing Sheets

FIG. 3

TBL2

| | SVID | QUERY NAME | | | | | | ACCESS COUNT | THRESHOLD |
|---|---|---|---|---|---|---|---|---|---|
| MEM 0 | SV 0 | A | B | C | | | ... | 52 | 20 |
| MEM 1 | SV 0 | | D | | E | | F | ... | 3 | 20 |
| MEM 2 | SV 0 | G | H | I | | | ... | 24 | 20 |
| MEM 3 | SV 1 | J | K | L | | | ... | 5 | 20 |
| MEM 4 | SV 1 | M | N | | | | ... | 12 | 20 |
| MEM 5 | SV 1 | | | | | | ... | 9 | 20 |
| MEM 6 | SV 2 | O | | P | Q | | ... | 7 | 20 |
| MEM 7 | SV 2 | R | S | | | | ... | 10 | 20 |
| MEM 8 | SV 2 | | | | | | ... | 15 | 20 |
| MEM 9 | SPARE | | | | | | ... | 0 | 20 |

FIG. 4

TBL1

| QUERY NAME | SVID | TIME COUNTER VALUE | ACCESS COUNT |
|---|---|---|---|
| A | SV 1 | 30 | 10 |
| B | SV 1 | 30 | 30 |
| C | SV 1 | 30 | 5 |
|  |  |  |  |
|  |  |  |  |
|  |  |  |  |
|  |  |  |  |
|  |  |  |  |
| ⋮ | ⋮ | ⋮ | ⋮ |

FIG. 11

| | SV ID | QUERY NAME | | | | | | | ACCESS COUNT | THRESHOLD |
|---|---|---|---|---|---|---|---|---|---|---|
| MEM 0 | SV0 → SV1 | A | B | C | | | | ... | 52 → 0 | 20 |
| MEM 1 | SV0 | | D | | E | | F | ... | 3 → 0 | 20 |
| MEM 2 | SV0 | G | H | I | | | | ... | 24 → 0 | 20 |
| MEM 3 | SV1 | J | K | L | | | | ... | 5 → 0 | 20 |
| MEM 4 | SV1 | M | N | | | | | ... | 12 → 0 | 20 |
| MEM 5 | SV1 | | | | | | | ... | 9 → 0 | 20 |
| MEM 6 | SV2 | O | | P | Q | | | ... | 7 → 0 | 20 |
| MEM 7 | SV2 | R | S | | | | | ... | 10 → 0 | 20 |
| MEM 8 | SV2 | | | | | | | ... | 15 → 0 | 20 |
| MEM 9 | SPARE | | | | | | | ... | 0 | 20 |

TBL2

FIG. 15

TBL2

| | SV ID | QUERY NAME | | | | | | ACCESS COUNT | THRESHOLD |
|---|---|---|---|---|---|---|---|---|---|
| MEM 0 | SV0 → SV1 | A | B | C | | | ... | 52 → 0 | 20 |
| MEM 1 | SV0 | | D | | E | | F | ... | 3 → 0 | 20 |
| MEM 2 | SV0 | G | H | I | | | ... | 24 → 0 | 20 |
| MEM 3 | SV1 → SV0 | J | K | L | | | ... | 5 → 0 | 20 |
| MEM 4 | SV1 | M | N | | | | ... | 12 → 0 | 20 |
| MEM 5 | SV1 | | | | | | ... | 9 → 0 | 20 |
| MEM 6 | SV2 | O | | P | Q | | ... | 7 → 0 | 20 |
| MEM 7 | SV2 | R | S | | | | ... | 10 → 0 | 20 |
| MEM 8 | SV2 | | | | | | ... | 15 → 0 | 20 |
| MEM 9 | SPARE | | | | | | ... | 0 | 20 |

FIG. 17

| QUERY NAME | ACCESS SERVER ID | TIME COUNTER VALUE | ACCESS COUNT |
|---|---|---|---|
| A | SV 1 | 30 | 10 |
| B | SV 1 | 30 | 30 |
| C | SV 1 | 30 | 5 |
| J | SV 0 | 30 | 3 |
| K | SV 0 | 30 | 2 |
| L | SV 0 | 30 | 6 |
| | | | |
| | | | |
| ⋮ | ⋮ | ⋮ | ⋮ |

TBL1

CHANGING CORRESPONDENCE AMONG CONTROL DEVICES AND MEMORIES BASED ON MEMORY ACCESS FREQUENCIES

CROSS-REFERENCE TO RELATED APPLICATION(S)

This application is based upon and claims the benefit of priority of the prior Japanese Patent Application No. 2012-062827 filed on Mar. 19, 2012, the entire contents of which are incorporated herein by reference.

FIELD

The embodiments discussed herein are related to a control device, a control method for a control device, and a recording medium.

BACKGROUND

In information processing systems such as databases that store data such as files and images, multiple information processing devices such as servers are provided in parallel, thereby balancing access load. However, in a case where access is concentrated on a specific information processing device, the information processing device on which access is concentrated becomes a bottleneck, and the overall performance of such information processing systems decreases.

For example, in order to balance the load on each information processing device, among data areas provided individually in association with multiple information processing devices, a data area that is referenced with high frequency is set as a shared data area that may be accessed from other information processing devices (see, for example, Japanese Laid-open Patent Publication No. 2005-339236).

In the case of a structured database, by adding an area indicating the number of records matching a search condition to an index including information for referencing each record, reading of records that are not used is avoided, thereby increasing search speed (see, for example, Japanese Laid-open Patent Publication No. 6-103307).

SUMMARY

According to an aspect of the invention, a control device includes a storage to store correspondence information indicating a correspondence between each of memories and each of information processing devices; and a processor to execute an operation including: detecting a first memory from among the memories, the first memory being a memory whose access frequency exceeds a predetermined access frequency or is relatively high, and a second memory being a memory whose access frequency is lower than or equal to a predetermined access frequency, changing the correspondence information so that an information processing device corresponding to the first memory changes from a first information processing device to a second information processing device corresponding to the second memory, and notifying a management device of the changed correspondence information, and outputting data read from the first memory to the management device via the second information processing device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts an example of a management table depicted in FIG. 2;

FIG. 4 depicts an example of a load balancing table depicted in FIG. 2;

FIG. 11 depicts an example of the management table after the load balancing operation depicted in FIG. 10 is performed;

FIG. 15 depicts an example of the management table after the load balancing operation depicted in FIG. 14 is performed;

FIG. 17 depicts an example of the load balancing table after the load balancing operation depicted in FIG. 16 is performed;

DESCRIPTION OF EMBODIMENTS

A management device that outputs access requests to information processing devices has to execute the process of determining how to balance the access requests in order to balance the load on each information processing device, which increases the load on the management device. Therefore, improvement of the performance of the information processing system becomes limited.

Hereinafter, embodiments will be described with reference to the drawings. Signals lines through which signals are transmitted will be denoted by the same symbols as signal names.

Figure 1:
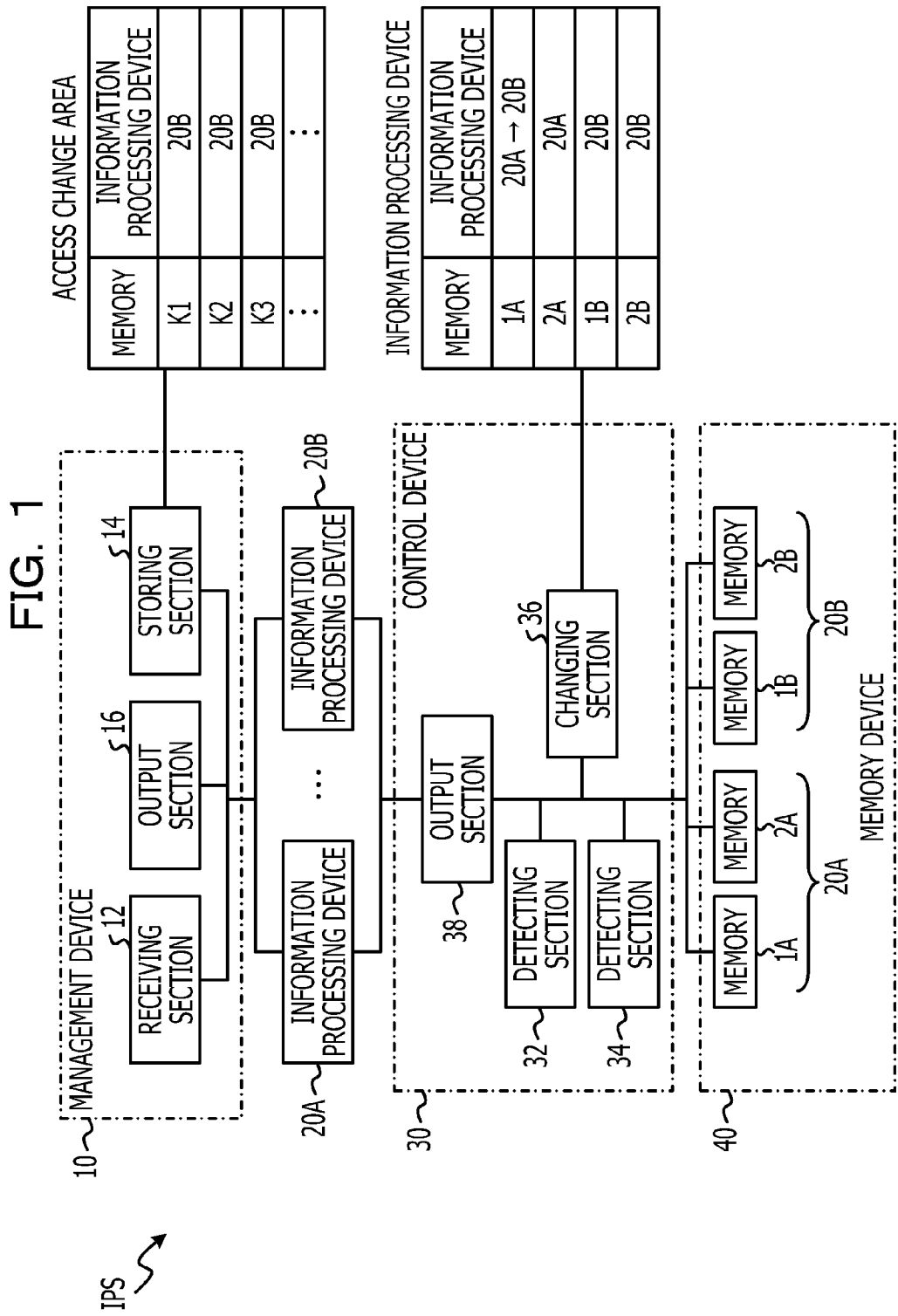
FIG. 1 depicts an example of an information processing system according to an embodiment.

FIG. 1 depicts an example of an information processing system IPS according to an embodiment. The information processing system IPS includes a management device 10, multiple information processing devices 20 (20A, 20B), a control device 30, and a memory device 40.

The management device 10 outputs an access request to one of the information processing devices 20A, 20B. Each of the information processing devices 20A, 20B outputs the access request from the management device 10 to the control device 30. The control device 30 is a control device that receives the access request supplied from the management device 10 via one of the information processing devices 20A, 20B, and controls access to the memory device 40. The memory device 40 includes memories A (1A, 2A) assigned to the information processing device 20A, and memories B (1B, 2B) assigned to the information processing device 20B.

The control device 30 detects at least one memory (e.g. 1A) whose access frequency is higher than those of other memories as a high-frequency memory. The control device 30 detects, from among the memories B assigned to the information processing device 20B excluding the information processing device 20A that is assigned the high-frequency memory 1A, at least one memory (e.g. 1B) whose access frequency is lower than those of other memories as a low-frequency memory. For example, one of memories whose access frequencies are higher than the average access frequency of the memories included in the memory device 40 may be detected as the high-frequency memory, or one of memories whose access frequencies are lower than the average access frequency of the memories included in the memory device 40 may be detected as the low-frequency memory.

The control device 30 may have a counting section that counts the number of times each of the memories 1A, 2A, 1B, 2B has been counted, at predetermined intervals. Then, a detecting section 32 may detect the memory with the highest access count as the high-frequency memory, from among those memories whose access counts are higher than a predetermined threshold. A detecting section 34 may detect the memory with the lowest access count as the low-frequency memory, from among those memories whose access counts are lower than a predetermined threshold. The counting section is implemented by, for example, a counting circuit configured by an electronic circuit.

The control device 30 changes the information processing device corresponding to the high-frequency memory 1A from the information processing device 20A to the information processing device 20B in a device information area. In the device information area, correspondence information indicating the correspondence between each of the memories A, B and the information processing device 20 is stored. Then, the control device 30 notifies the management device 10 of the changed information. The management device 10 that has received the notification outputs an access request for the high-frequency memory 1A, not via the information processing device 20A but via the information processing device 20B that is assigned the low-frequency memory 1B. In response to the access request, the control device 30 outputs data read from the high-frequency memory 1A to the management device 10, via the information processing device 20B that is assigned the low-frequency memory 1B. For example, the device information area is allocated in a storage such as a memory. The device information area may be allocated in a memory within the control device 30.

According to this embodiment, in accordance with a notification from the control device 30, the management device 10 may update an access change area allocated in a storage such as a memory, and change the path of an access request for the high-frequency memory 1A. Therefore, the management device 10 does not have to determine to which information processing device 20 an access request is to be outputted, by taking access concentration into consideration. The access change area may be allocated in a memory within the management device 10.

For example, in a case where the management device 10 is hardware such as a logic circuit, the management device 10 includes a receiving section 12, a storing section 14, and an output section 16. In a case where the receiving section 12 receives information indicating the high-frequency memory 1A and the information processing device 20B from the control device 30, the receiving section 12 recognizes that an access request for the high-frequency memory 1A is to be outputted to the information processing device 20B that is assigned the low-frequency memory 1B.

The storing section 14 stores identification information indicating the information processing device 20B into the access change area, together with key information indicating keys K (K1, K2, K3, and so on) corresponding to data stored in the high-frequency memory 1A. At this time, each key corresponding to data is held by the management device 10 in advance when outputting the data to the information processing device 20 together with an access request (write request).

When a key received together with an access request from a host system such as a computer device that outputs an access request to the management device 10 is stored in the access change area, the output section 16 outputs the access request to the information processing device 20 stored in the access change area. When the key received from the host system is not stored in the access change area, for example, the output section 16 outputs the access request to the information processing device 20 indicated by a value obtained from the key, by using an algorithm such as a hash function.

In a case where the management device 10 includes a processor such as a central processing unit (CPU), and the function of the management device 10 is implemented by a program executed by the CPU, the functions of the receiving section 12, storing section 14, and output section 16 are implemented by the program.

For example, in a case where the control device 30 is designed by a hardware logic such as a logic circuit, the control device 30 includes the detecting sections 32, 34, a changing section 36, and an output section 38. The detecting section 32 detects at least one memory as a high-frequency memory. The detecting section 34 detects at least one memory as a low-frequency memory. The changing section 36 changes information indicating the information processing device 20 (20A in this example) stored in the device information area in association with the high-frequency memory, to information indicating the information processing device 20 (20B in this example) that is assigned the low-frequency memory.

The output section 38 notifies the management device 10 of the contents of the changed device information area. On the basis of the contents of the device information area, the output section 38 outputs data read from the high-frequency memory to the management device 10 via the information processing device 20 that is assigned the low-frequency memory.

In a case where the control device 30 includes a processor that executes a program such as a central processing unit (CPU), the functions of the detecting sections 32, 34, changing section 36, and output section 38 of the control device 30 may be implemented by the program.

As described above, according to this embodiment, assignment of the high-frequency memory 1A may be changed from the information processing device 20A to the information processing device 20B by referencing the access change area, without the management device 10 performing a process such as determining the information processing device 20 to which to output an access request. As a result, the load on the information processing device 20A on which access is concentrated may be reduced without increasing the load on the management device 10, thereby improving the performance of the information processing system IPS.

Figure 2:
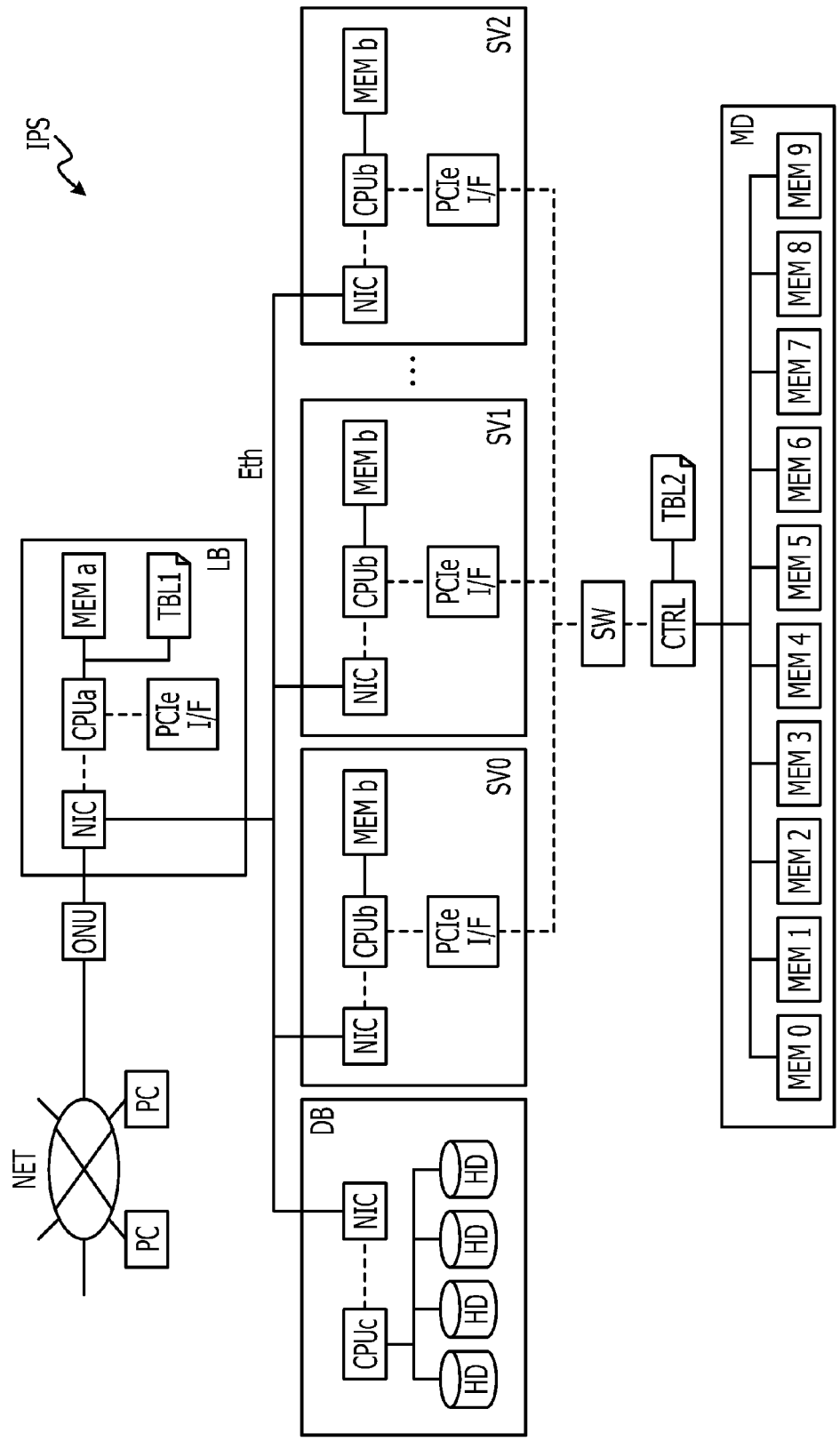
FIG. 2 depicts an example of the information processing system according to another embodiment.

FIG. 2 depicts an example of the information processing system IPS according to another embodiment. Elements that are the same as the elements described with reference to the above-mentioned embodiment are denoted by the same symbols, and a detailed description is omitted for these elements.

The information processing system IPS includes a management device LB having a load balancing table TBL1, a database DB, multiple servers SV (SV0, SV1, SV2), a switch SW, a control device CTRL, a management table TBL2, and a memory device MD. The servers SV0 to SV2 are an example of information processing devices. The number of these servers is not limited to three. The management table TBL2 is an example of a storage, and may be included in a part of the internal memory or register of the control device CTRL. The control device CTRL and the management table TBL2 may be provided within the memory device MD. Thick broken lines depicted in FIG. 2 indicate cables or signal lines that transmit signals of the PCI Express standard. The thick broken lines may indicate cables or signal lines that transmit signals of another standard.

The information processing system IPS is, for example, a Web server that performs communication by using the Hyper Text Transfer Protocol (HTTP). The information processing system IPS is accessed from a computer (personal computer (PC)) that is a client coupled to a computer network NET such as the Ethernet. In accordance with an access request, the information processing system IPS stores new data into the management device LB and the memory device MD, or updates data stored in the management device LB and the memory device MD. In accordance with an access request, the information processing system IPS reads data accumulated in the management device LB or the memory device MD, and outputs the read data to the computer network NET.

The management device LB includes a processor CPUa, a memory MEMa, a network interface card NIC, and a PCI Express interface card PCIeI/F. The management device LB is coupled to the computer network NET via the network interface card NIC and an optical network unit (ONU) or the like. The management device LB is coupled to the database DB and the network interface cards NIC of the servers SV0 to SV2 via the network interface card NIC.

For example, the management device LB, the database DB, and the servers SV0 to SV2 are coupled to each other by a cable Eth of the Ethernet (R) standard. The management device LB, the database DB, and the servers SV0 to SV2 may be coupled to each other by a cable of another standard. The load balancing table TBL1 of the management device LB is an example of a storage. The load balancing table TBL1 is included in a part of the memory MEMa, or is included in a part of the internal memory or register of the processor CPU. The load balancing table TBL1 will be described with reference to FIG. 4.

The management device LB may be designed by a logic LSI such as an application specific integrated circuit (ASIC). The processing by the management device LB is executed by using a hardware logic when the management device LB is a logic LSI. The processing by the management device LB is executed by a program when the management device LB is a processor or microcontroller.

The processor CPUa is operated by executing a program stored in the memory MEMa. The processor CPUa has the function of writing data supplied from the network NET to the database DB and the memory device MD. The processor CPUa also has the function of outputting data read from the database DB or the memory device MD to the network NET. At this time, the management device LB determines the server SV to access for each key such as a query, by using a predetermined algorithm such as a hash function. A key (query) is information indicating a processing request for the information processing system IPS, for example, a string of characters such as "computer" or "server".

For example, the memory MEMa is a memory module such as a dual inline memory module (DIMM) installed with multiple dynamic random access memory (DRAM) chips. The management device LB functions as a load balancer for balancing access requests for the servers SV0 to SV2. However, the management device LB does not perform the process of determining which server SV to access. Therefore, the load on the management device LB may be reduced.

The database DB is, for example, a relational database. The database DB includes a processor CPUc, a network interface card NIC, and at least one hard disk drive device HD.

Since the servers SV0 to SV2 are configured similarly to each other, the server SV0 will be described below. The number of the servers SV0 to SV2 coupled to the management device LB may be any number not less than two. The server SV0 includes a processor CPUb, a memory MEMb, a network interface card NIC, and a PCI Express interface card PCIeI/F. The processor CPUb is operated by executing a program stored in the memory MEMb. The processor CPUb writes data supplied from the management device LB to the memory device MD, and outputs data read from the memory device MD to the management device LB. For example, like the memory MEMa, the memory MEMb is a memory module installed with multiple DRAM chips.

The switch SW is provided common to the servers SV0 to SV2, in order to connect to the servers SV0 to SV2 to the memory device MD via a cable or signal line of the PCI Express standard. For example, the servers SV0 to SV2 and the memory device MD are coupled via the switch SW by using the Multi Root I/O Virtualization (MR-IOV) technique. Data outputted from each of the servers SV0 to SV2 is transmitted to the memory device MD, and data outputted from the memory device MD is transmitted to one of the servers SV0 to SV2.

The memory device MD includes multiple memories MEM (MEM0 to MEM9). For example, like the memories MEMa, MEMb, each memory MEM is a memory module installed with multiple DRAM chips. The number of memories MEM to be provided may be any number greater than the number of servers SV, and is not limited to 10. The memories MEM0 to MEM9 are each assigned to one of the servers SV0 to SV2, or assigned as a spare, in accordance with information set in the management table TBL2.

For example, the control device CTRL is designed by a logic LSI such as an ASIC. The management table TBL2 may be provided within a memory chip such as a random access memory (RAM), or may be provided within the internal register or memory of the control device CTRL. The management table TBL2 will be described with reference to FIG. 3. The control device CTRL may be a microcontroller or a processor CPU with embedded read only memory (ROM) and RAM.

The control device CTRL writes data (a value corresponding to a query) outputted from each of the servers SV0 to SV2 together with a write request, to one of the memories MEM0 to MEM9 in association with the query. The control device CTRL reads data corresponding to a query from one of the memories MEM0 to MEM9, in accordance with a read request from each of the servers SV0 to SV2. Then, the control device CTRL outputs the read data to each of the servers SV0 to SV2.

The control device CTRL and the management table TBL2 may be provided within the memory device MD together with the memories MEM0 to MEM9. The servers SV0 to SV2, the control device CTRL, and the memory device MD each function as a distributed cache server for accessing data stored in the database DB.

The information processing system IPS depicted in FIG. 2 is not limited to a Web server but may be applied to a server that performs communication by using a protocol other than the HTTP protocol, such as a data server, a mail server, or a file server. The information processing system IPS may be applied to a distributed cache server for an office computer, a workstation, or a mainframe.

FIG. 3 depicts an example of the management table TBL2 depicted in FIG. 2. The management table TBL2 is allocated within a memory or register that may be read from and written to by the control device CTRL. The management table TBL2 includes a device information area that stores, for each of the memories MEM0 to MEM9, server name SVID that is assigned each of the memories MEM0 to MEM9, query name, access count, and threshold. In the server name SVID, information indicating the servers SV0 to SV2 that access each of the memories MEM0 to MEM9 is stored. The server name SVID is stored into the management table TBL2 by the control device CTRL on the basis of a notification from the management device LB, at the time of the assignment operation of the information processing system IPS depicted in FIG. 6.

The query name area in which queries are stored is partitioned in accordance with the address space of each memory MEM. The location within the memory MEM into which data corresponding to a query is stored is detected from the position where the query is stored within the query name area. The example depicted in FIG. 3 indicates that Queries A, B, C are respectively stored in the first three blocks of the memory MEM0. Also, the example depicted in FIG. 3 indicates that Queries D, E, F are respectively stored in the second, fourth, and seventh blocks of the memory MEM1. Blank areas in the query name area indicate that no data is written, data has been erased, or data has become invalid owing to a timeout.

When the control device CTRL receives a write request for data from the server SV together with a query, the control device CTRL selects one of the multiple memories MEM corresponding to the server name SVID, and writes the query to the corresponding query name area. For example, the control device CTRL determines the memory MEM with many free spaces by referencing the query name area, and writes the query to the query name area corresponding to the determined memory MEM. Alternatively, the control device CTRL sequentially writes queries to the query name areas of the multiple memories MEM corresponding to the server name SVID, by using a method such as Round Robin. Then, the control device CTRL writes data (value) corresponding to the query to the area of the memory MEM corresponding to the query name area into which the query is stored.

When the control device CTRL receives a read request for data from the server SV, the control device CTRL searches the query name area by using a query received together with the read request, and identifies the block area of the memory MEM in which data corresponding to the query is stored. Then, the control device CTRL reads data corresponding to the query from the identified block area of the memory MEM, and outputs the read data to the server SV from which the read request is received.

The access count indicates the number of times each memory MEM has been accessed. For example, in the information processing system IPS in which the number of accesses to the memory MEM due to a read request is sufficiently larger than the number of accesses to the memory MEM due to a write request, the number of read requests may be registered as the access count. At this time, the control device CTRL increments the access count for every read request. In the information processing system IPS in which there is not much difference between the number of read requests and the number of write requests, the sum of the numbers of read requests and write requests may be registered as the access count. At this time, the control device CTRL increments the access count for every read request and for every write request.

Figure 9:
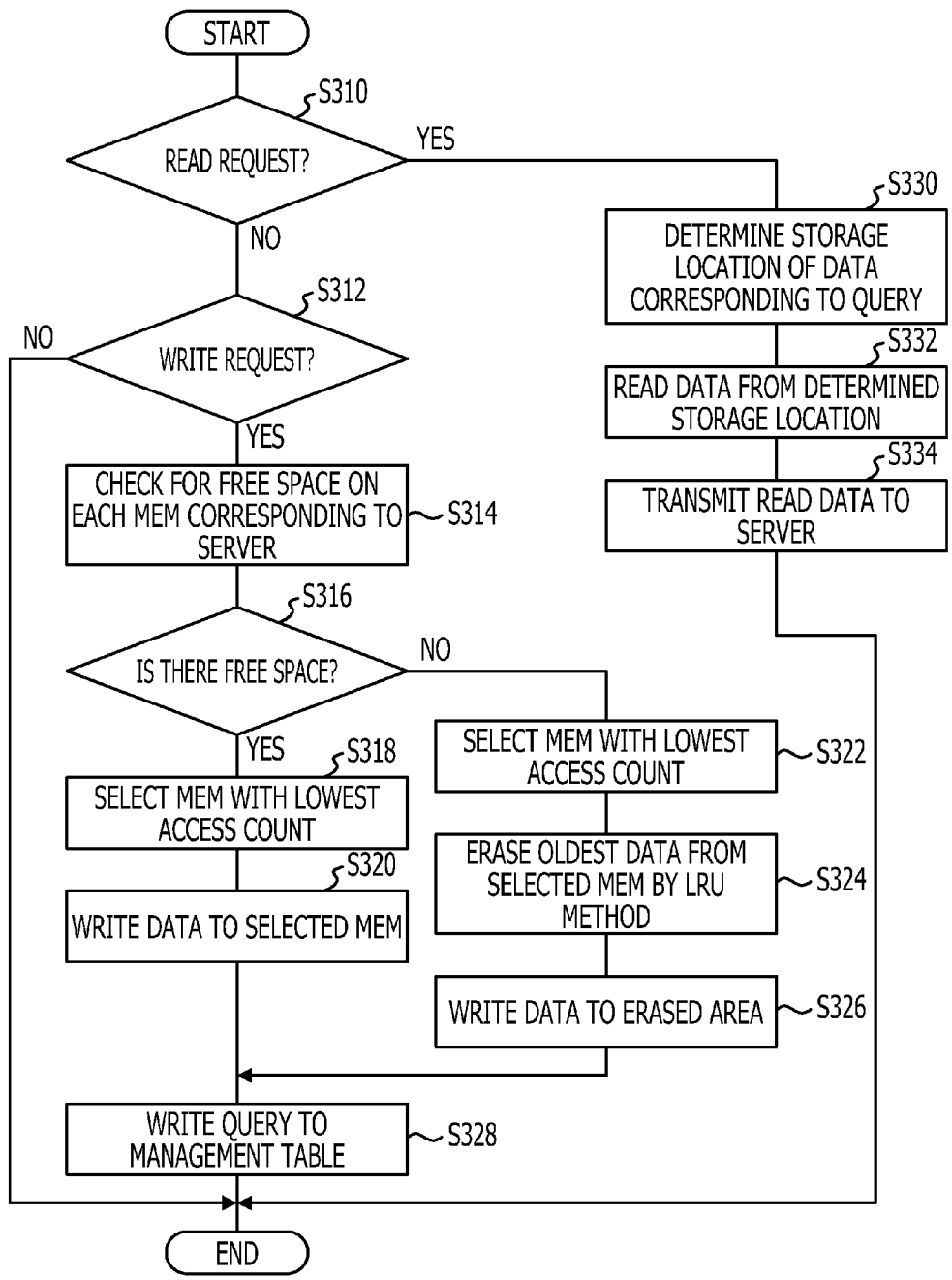
FIG. 9 depicts an example of the operation of a control device that has received the write request depicted in FIG. 7 and the read request depicted in FIG. 8.

The control device CTRL resets the access count upon elapse of a predetermined period of time, and resets the access count at the time of load balancing operation depicted in FIG. 9. Therefore, the access frequency of each memory MEM may be indicated by the access count. The memory MEM whose access count is higher than those of other memories MEM is determined to be accessed with high frequency. A memory MEM whose access count is lower than those of other memories MEM is determined to be accessed with low frequency. The operation in which the control device CTRL counts the access count for each memory MEM at predetermined intervals by incrementing the access count and resetting the access count every predetermined period is performed by the counting section of the control device CTRL.

The threshold is a value used for determining whether the access frequency of each memory MEM is high or low. The threshold is set at the time of assignment operation of the information processing system IPS depicted in FIG. 6. The access frequency is determined to be high when the access count is higher than the threshold, and is determined to be low when the access count is lower than the threshold.

In this example, the thresholds for the memories MEM0 to MEM9 are all set to the same value. However, the threshold may differ for each of the memories MEM0 to MEM9. For example, in a case where the performance of the processor CPUb varies for each server SV, the threshold stored in the management table TBL2 may be set higher for the memory MEM that is accessed by the server SV including a CPUb whose performance is higher than those of other CPUb's. In a case where the threshold is the same for all of the memories MEM0 to MEM9, the threshold may be set in an area common to the memories MEM0 to MEM9 in the management table TBL2.

FIG. 4 depicts an example of the load balancing table TBL1 depicted in FIG. 2. The load balancing table TBL1 includes multiple access change areas storing query name, server name SVID to access, time counter value, and access count.

The query name area is provided for accessing data corresponding to a query assigned to the server SV whose access frequency is higher than those of other servers SV, via the server SV whose access frequency is lower than those of other servers SV. When accessing data corresponding to a query registered in the load balancing table TBL1, the management device LB transmits the access request not to the server SV determined by using an algorithm such as a hash function but to the server SV stored in the field of the server name SVID. Therefore, as will be described later, the load on the server SV on which access is concentrated may be balanced, without changing an algorithm such as a hash function. The method of balancing the load on the server SV by using the load balancing table TBL1 will be described with reference to FIGS. 10 to 13.

The time counter value and the access count are used for creating a free space on the load balancing table TBL1, when changing assignment of a query from the server SV on which access is concentrated to another server SV, in a state in which there is no free space on the load balancing table TBL1. The method of creating a free space will be described with reference to FIG. 13.

In a case where stored query names are randomly erased at predetermined intervals or erased sequentially in order to create a free space on the load balancing table TBL1, the areas of time counter value and access count may not be provided. Alternatively, when the size of the load balancing table TBL1 is large enough to register all query names into the load balancing table TBL1, the areas of time counter value and access count may not be provided.

Figure 5:
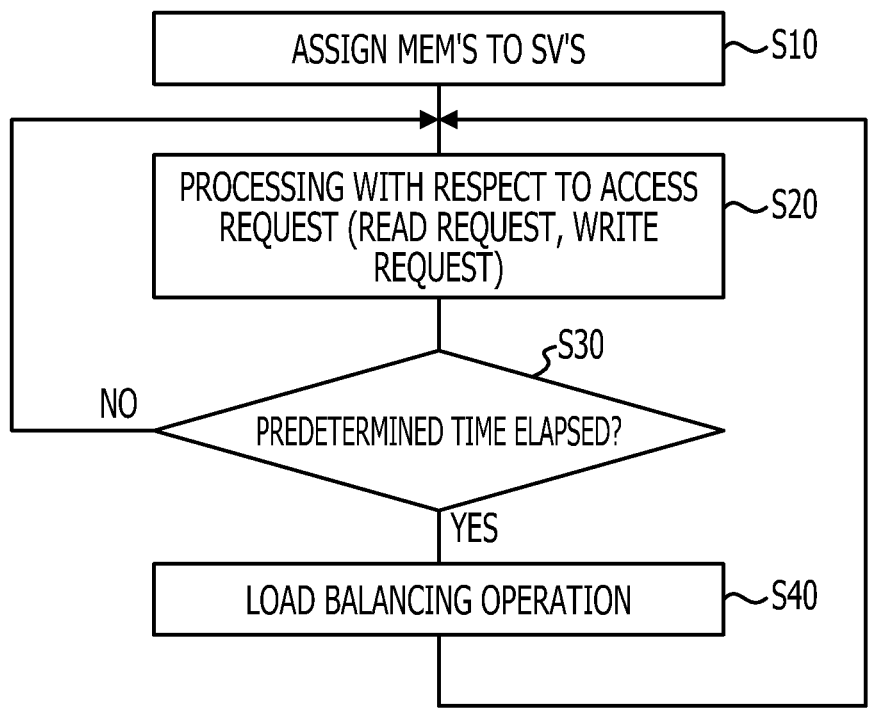
FIG. 5 depicts an example of the operation of the information processing system depicted in FIG. 2.

FIG. 5 depicts an example of the operation of the information processing system IPS depicted in FIG. 2. The operation depicted in FIG. 5 is performed by the management device LB, the server SV, and the control device CTRL operating in cooperation with each other.

First, in S10, the information processing system IPS assigns the memories MEM0 to MEM9 to the servers SV0 to SV2. For example, S10 is performed at power-on or reset of the information processing system IPS. An example of the operation in S10 will be described with reference to FIG. 6.

Next, in S20, the information processing system IPS performs processing with respect to an access request (read request or write request) from the computer PC or the like coupled to the computer network NET. When the management device LB receives a read request together with a query, the management device LB reads data corresponding to the query from the memory device MD via one of the servers SV0 to SV2, or reads data corresponding to the query from the database DB. The management device LB transmits the read data to the computer PC or the like. When the management device LB receives a write request together with a query and data, the management device LB writes the data to the memory device MD via one of the servers SV0 to SV2, or writes the data to the database DB. An example of the operation in S20 will be described with reference to FIGS. 7 to 9.

In S30, the information processing system IPS determines whether a predetermined time has elapsed. A load balancing operation in S40 is performed when the predetermined time has elapsed. That is, the load balancing operation is performed at predetermined intervals. The information processing system IPS repeatedly performs S20 until the predetermined time elapses.

In the load balancing operation in S40, assignment of a query (i.e. memory MEM) to the servers SV0 to SV2 is changed in accordance with the degree of concentration of access on each of the servers SV0 to SV2. An example of the operation in S40 will be described with reference to FIGS. 10 to 13.

Figure 6:
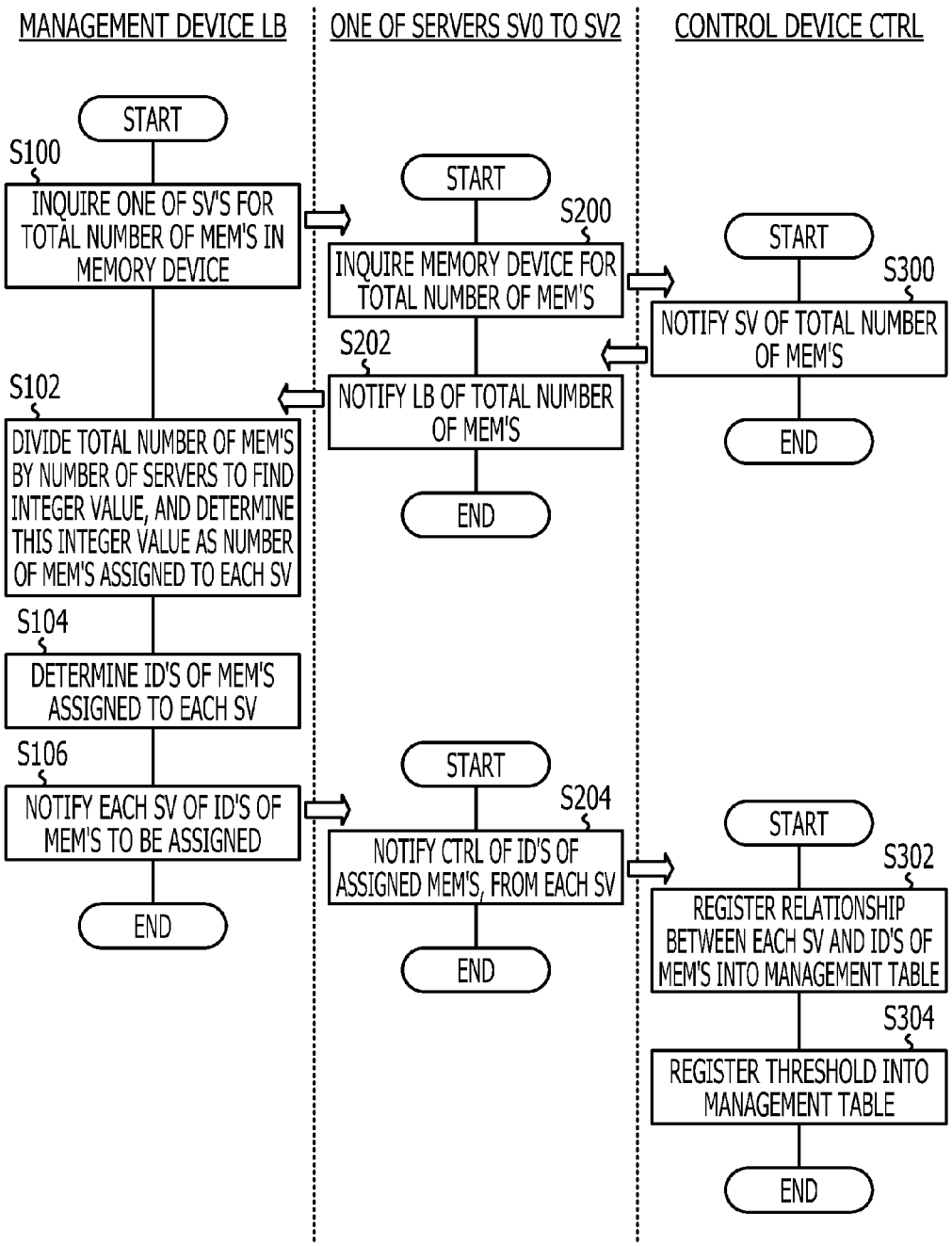
FIG. 6 depicts an example of the operation of assigning each memory in a memory device to one of servers in the information processing system depicted in FIG. 2.

FIG. 6 depicts an example of the operation of assigning each memory MEM in the memory device MD to one of the servers SV in the information processing system IPS depicted in FIG. 2. The processing by the management device LB depicted in FIG. 6 is performed by the processor CPUa depicted in FIG. 2 executing a program. The processing by the server SV depicted in FIG. 6 is performed by the processor CPUb depicted in FIG. 2 executing a program. The processing by the management device LB and the processing by the server SV may be performed through processing using a hardware logic. The processing by the control device CTRL depicted in FIG. 6 is executed by using a hardware logic when the control device CTRL is a logic LSI such as an ASIC. The processing by the control device CTRL is executed by using a program when the control device CTRL is a processor or a microcontroller.

First, in S100, the management device LB outputs a packet inquiring the total number of memories MEM installed in the memory device MD, to one of the servers SV0 to SV2. For example, the server SV that receives the inquiry may be the server SV0 with the smallest-numbered server name SVID. In S200, the server SV that has received the inquiry outputs the packet inquiring the total number of memories MEM installed in the memory device MD, to the control device CTRL of the memory device MD.

In S300, the control device CTRL notifies the server SV that has transmitted the inquiry of the total number of memories MEM. For example, the control device CTRL includes a register storing the total number of memories MEM. When each memory MEM is an expandable memory module, the control device CTRL may determine the total number of memories MEM by detecting memory modules inserted in memory slots.

In S202, the server SV that has transmitted the inquiry notifies the management device LB of the total number of memories MEM received from the control device CTRL. In S102, the management device LB divides the total number of memories MEM by the number of servers SV, finds an integer value by dropping the decimals, for example, and determines the integer value as the number of memories MEM assigned to each server SV. For example, when the total number of memories MEM is 10, and the number of servers SV is 3, three memories MEM are assigned to each server SV, and the remaining one memory MEM is secured as a spare.

In S104, the management device LB determines the identification (ID) of each of the memories MEM assigned to each server SV. The ID of each memory MEM is the number at the end of the memory MEM depicted in FIG. 2. For example, as depicted in FIG. 3, the management device LB determines to assign three of the memories MEM0 to MEM8 to each of the servers SV0 to SV2, in increasing order of their ID number. Then, the management device LB determines to secure the memory MEM9 as a spare. Next, in S106, the management device LB notifies the servers SV0 to SV2 of the IDs of memories MEM assigned to the respective servers SV0 to SV2.

In S204, each of the servers SV0 to SV2 notifies the control device CTRL of the notified IDs of the memories MEM. In S302, the control device CTRL registers, for each memory MEM, the ID of the server SV that accesses the memory MEM into the area of the server name SVID of the management table TBL2. Next, in S304, the control device CTRL registers a predetermined threshold into the management table TBL2. Performing the processing in FIG. 6 causes the management table TBL2 to become an initial state. In the initial state, the areas of query name and access count depicted in FIG. 3 are empty.

Figure 7:
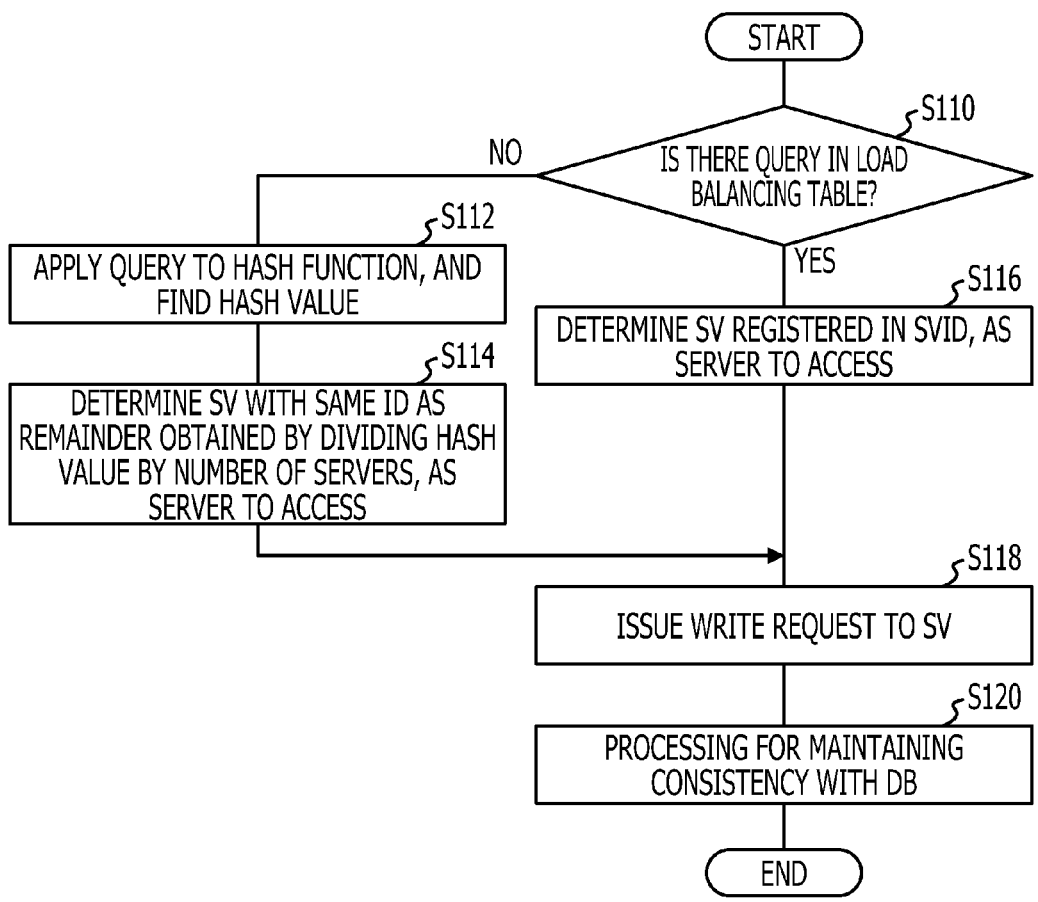
FIG. 7 depicts an example of the operation of a management device when writing data to the information processing system depicted in FIG. 2.

FIG. 7 depicts an example of the operation of the management device LB when writing data to the information processing system IPS depicted in FIG. 2. For example, the processing depicted in FIG. 7 is performed by the processor CPUa depicted in FIG. 2 executing a program.

In S110, when the management device LB receives a write request together with a query and data, the management device LB determines whether or not the query is registered in the load balancing table TBL1. When the query is registered in the load balancing table TBL1, the processing transfers to S116. When the query is not registered in the load balancing table TBL1, the processing transfers to S112.

In S112, the management device LB applies the query to a hash function, and finds a hash value. In S114, for example, the management device LB divides the hash value by the number of memories MEM ("3" in this example) assigned to each server SV to find the remainder, and determines the server SV having an ID of the same value as the remainder to be the server SV to access.

For example, when the hash value is "F12D" in hexadecimal notation (61741 in decimal notation), the remainder is "1", and hence the server SV1 is accessed. The query may be applied to an algorithm other than a hash function to find a value indicating the ID of the server SV to access. Alternatively, a hash function for directly finding the ID of the server SV to access may be used.

In S116, when the query is registered in the load balancing table TBL1, the management device LB determines the server SV registered in the area of the server name SVID corresponding to the query, to be the server SV to access. The management device LB is unable to grasp the memory MEM to which data corresponding to the query is written. Accordingly, the memory MEM to which data corresponding to the query is written is determined by the server SV or the control device CTRL.

The management device LB is able to recognize the server SV to which to transmit a write request, by referencing the load balancing table TBL1. Accordingly, the management device LB does not have to perform the process of determining the server SV to which to output an access request, in order to balance the load on each server SV. Therefore, the performance of the information processing system IPS may be improved without increasing the load on the management device LB.

In S118, to write data corresponding to the query to the memory MEM, the management device LB transmits a write request together with the query and the data to the server SV determined in S114 or S116. The server SV that has received the write request outputs the write request to the control device CTRL together with the query and the data. The operation of writing data by the control device CTRL will be described with reference to FIG. 9.

In S120, in order to maintain the consistency of data stored in the server SV (i.e. memory MEM) and the database DB, the management device LB writes the same data as the data written to the memory MEM, to the database DB together with the query. The write timing of data to be database DB may not be synchronized with the writing of data to the memory MEM. For example, the management device LB is provided with a flag corresponding to the query. Then, during the period until the data written to the memory MEM is written to the database DB, the management device LB sets a dirty flag indicating that the data in the memory MEM and the data in the database DB do not match. The management device LB inhibits reading of data from the database DB when the dirty flag is set. This may avoid a situation where erroneous is read data from the database DB when consistency is not ensured between the server SV and the database DB. For example, to maintain the consistency between the server SV and the database DB, when the management device LB receives an erase command for data corresponding to a query for which the dirty flag is being set, the management device LB performs the process of erasing data within the database DB, in addition to the process of erasing data within the memory MEM.

In a case where the processing by the management device LB is performed by a hardware logic, the operation of transmitting a write request to the server SV in S118 is performed by the output section 16 of the management device LB, on the basis of S110, S112, S114, S116.

Figure 8:
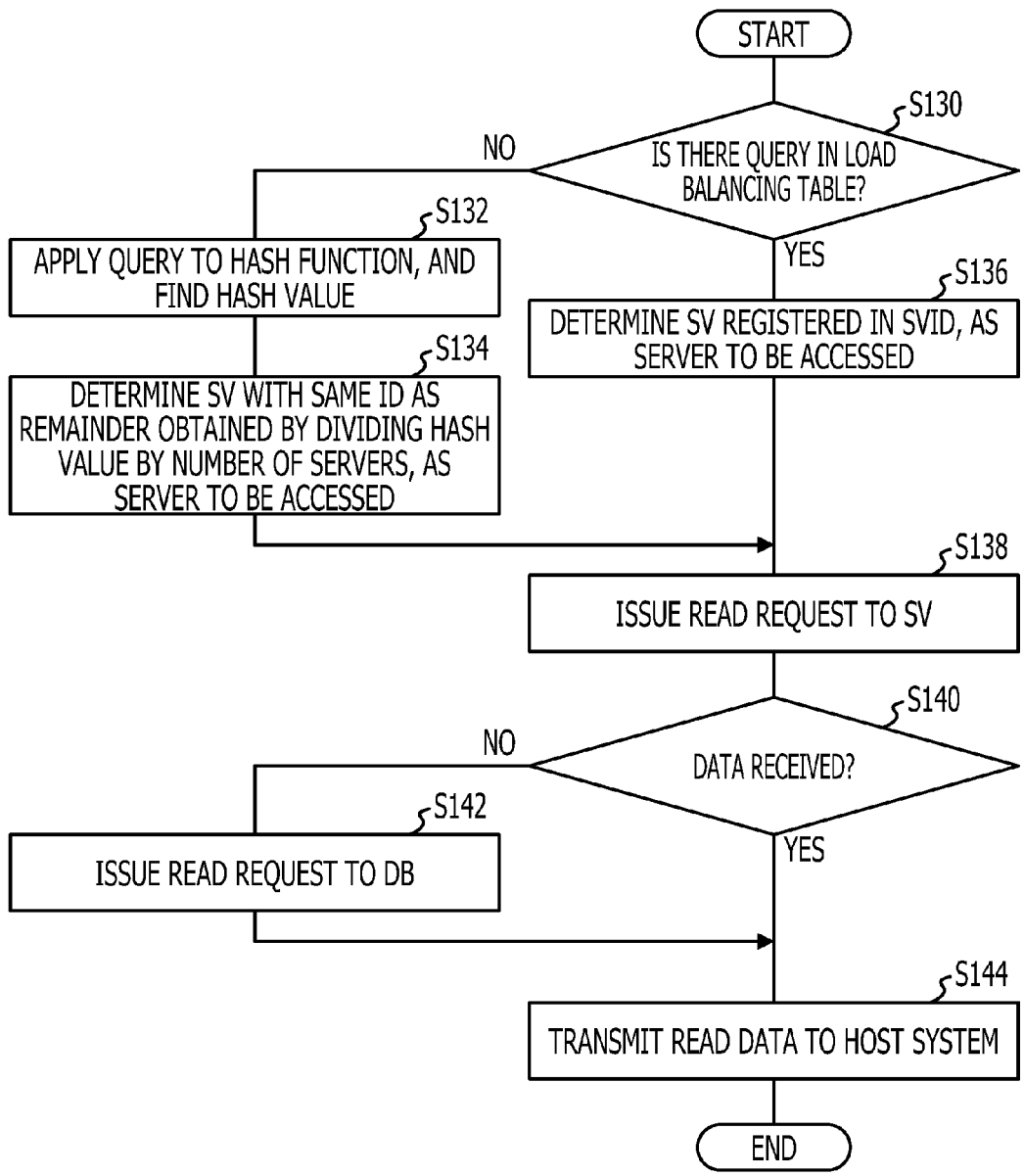
FIG. 8 depicts an example of the operation of the management device when reading data from the information processing system depicted in FIG. 2.

FIG. 8 depicts an example of the operation of the management device LB when reading data from the information processing system IPS depicted in FIG. 2. For example, the processing depicted in FIG. 8 is performed by the processor CPUa depicted in FIG. 2 executing a program. Since S130, S132, S134, S136 are the same processes as S110, S112, S114, S116 depicted in FIG. 7, a description of these processes is omitted.

In S138, to read data corresponding to a query from the memory MEM, the management device LB transmits a read request to the server SV determined in S134 or S136 together with the query. The server SV that has received the read request outputs the read request to the control device CTRL together with the query. The operation of reading data by the control device CTRL will be described with reference to FIG. 9.

In S140, upon receiving data corresponding to the query from the server SV, the management device LB transfers the processing to S144. When data corresponding to the query is not stored in the server SV (i.e. memory MEM), and the management device LB is unable to receive the data, the management device LB transfers the processing to S142. The management device LB is notified of information indicating that data corresponding to the query is not stored in the server SV, from the server SV as a response to the read request (e.g. a read error).

In S142, the management device LB transmits a read request to the database DB together with the query. Then, the management device LB reads data corresponding to the query from the database DB. Next, in S144, the management device LB transmits the read data to the computer PC or the like coupled to the computer network NET.

In a case where the processing by the management device LB is performed by a hardware logic, the operation of transmitting a read request to the server SV in S138 is performed by the output section of the management device LB on the basis of S130, S132, S134, S136.

FIG. 9 depicts an example of the operation of the control device CTRL that has received the write request depicted in FIG. 7 and the read request depicted in FIG. 8. The processing depicted in FIG. 9 is executed by using a hardware logic when the control device CTRL is a logic LSI such as an ASIC. The processing depicted in FIG. 9 is executed by a program when the control device CTRL is a processor or a microcontroller.

In S310, the control device CTRL transfers the processing to S330 when the control device CTRL receives the read request from the server SV. In S312, the control device CTRL transfers the processing to S314 when the control device CTRL receives the write request from the server SV. The control device CTRL ends the processing when neither the read request nor the write request is received from the server SV.

In S314, the control device CTRL references the management table TBL2, and checks for free space on each memory MEM corresponding to the server SV that has transmitted the write request. For example, the control device CTRL determines that there is free space on the memory MEM when there is free space on the query name area of the management table TBL2. The control device CTRL determines that there is no free space on the memory MEM when queries are registered in the entire query name area of the management table TBL2. In S316, the control device CTRL transfers the processing to S318 when there is free space on the memory MEM. The control device CTRL transfers the processing to S322 when there is no free space on the memory MEM.

In S318, the control device CTRL references the management table TBL2, and selects the memory whose access count is the lowest among multiple memories MEM corresponding to the server SV. Next, in S320, the control device CTRL writes data to the selected memory MEM. At this time, for example, the control device CTRL sequentially selects the memory MEM to which to write data by using the Round Robin method.

By writing data to the memory MEM with the lowest access count, the access frequencies of multiple memories MEM accessed by the server SV may be equalized. Generally, for each memory MEM, the number of clock cycles (latency) until data is outputted after a read request is received is determined. When read operations by random access are executed in succession, by transmitting a read request to another memory MEM until data is outputted after transmitting a read request to one memory MEM, the data transfer rate becomes higher than is otherwise the case. Accordingly, to improve read efficiency, it is desirable that the number of pieces of data stored in each memory MEM be equal.

In a case where it is desired to reduce the power consumption of the memory device MD, in S318, the memory MEM with the highest access count, or one memory may be selected so that data is written to a predetermined memory in a concentrated fashion. In this way, the memory MEM in which no data is stored may be set to a low power consumption mode, thereby reducing the power consumption of the memory device MD. In low power consumption mode, the operation of the internal voltage generating circuit or the like of the memory MEM stops, or a refresh operation is inhibited in the case of a DRAM, thereby reducing power consumption.

When there is no free space on the memory MEM, in S322, the control device CTRL references the management table TBL2, and selects the memory MEM with the lowest access count, among multiple memories MEM corresponding to the server SV. Next, in S324, the control device CTRL erases the oldest data stored in the selected memory MEM by using the Least Recently Used (LRU) method. The oldest data means the data that has not been accessed for the longest time. To use the LRU method, for each data corresponding to a query, information indicating the last accessed time is stored in the memory MEM.

In S326, the control device CTRL writes new data corresponding to a query to the area where data has been erased. In S328, the control device CTRL writes the query to the query name area corresponding to the area of the memory MEM to which data has been written, in the management table TBL2.

In S330, the control device CTRL references the query name area of the management table TBL2, and identifies the ID of the memory MEM in which data corresponding to the query received together with the read request is stored, and the storage location within the memory MEM. When the query sent from the server SV does not exist in the query name area of the management table TBL2, the control device CTRL holds miss information indicating that data corresponding to the query is not stored. In S332, the control device CTRL reads data from the identified storage location. However, when miss information is held, the control device CTRL does not perform the reading of data.

In S334, the control device CTRL transmits the read data to the server SV. When miss information is held in S330, the control device CTRL transmits information indicating that data corresponding to the query is not stored, to the server SV.

Figure 10:
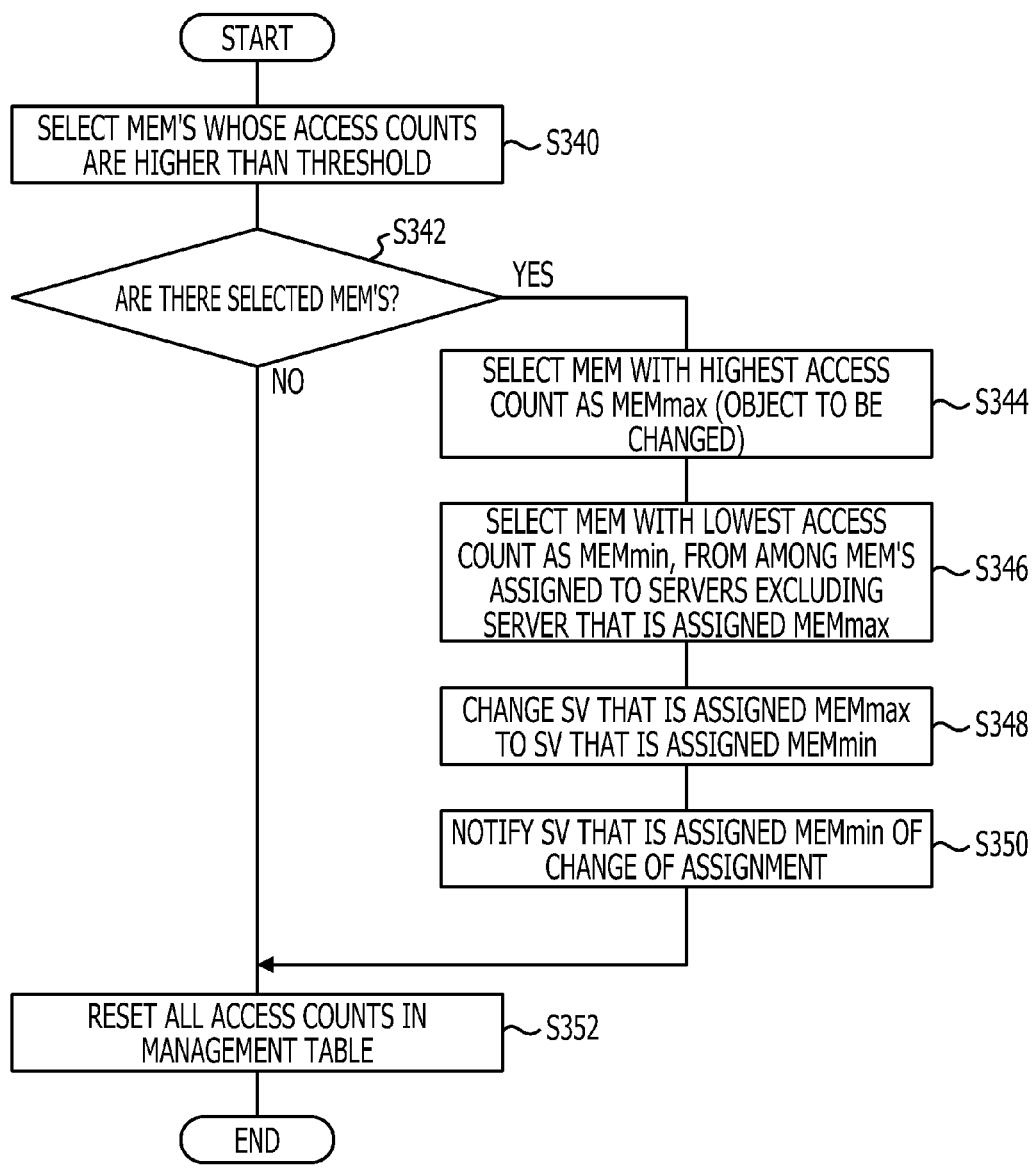
FIG. 10 depicts an example of the operation of the control device in a load balancing operation of the information processing system depicted in FIG. 2.

FIG. 10 depicts an example of the operation of the control device CTRL in the load balancing operation of the information processing system IPS depicted in FIG. 2. As in FIG. 9, the processing depicted in FIG. 10 is performed by the operation of the hardware logic of the control device CTRL, or a program executed by the control device CTRL. The processing depicted in FIG. 10 is performed at predetermined intervals (e.g. at 30-minute intervals).

First, in S340, the control device CTRL references the management table TBL2, and selects the memories MEM with access counts higher than a threshold. In the example of the management table TBL2 depicted in FIG. 3, the memories MEM0, MEM2 are selected. In S342, when there are selected memories MEM, the control device CTRL transfers the processing to S344, and when there is no selected memory, the control device CTRL transfers the processing to S352.

In S344, the control device CTRL selects the memory MEM whose access count is the highest among the selected memories MEM, as a memory MEMmax (object to be changed) whose assignment to the server SV is to be changed. The memory MEMmax is recognized as a high-frequency memory whose access frequency is higher than those of other memories MEM. In the example of the management table TBL2 depicted in FIG. 3, the memory MEM0 is selected. When there are multiple memories MEM with the highest access count, for example, the control device CTRL selects the memory MEM with the smallest-numbered ID as the memory MEMmax. The control device CTRL may select two memories MEM with the highest access count as memories MEMmax.

In S346, the control device CTRL references the management table TBL2, and selects the memories MEM whose access counts are lower than the threshold, from among the memories MEM assigned to the servers SV excluding the server SV that is assigned the memory MEMmax. Further, the control device CTRL selects the memory MEM with the lowest access count as a memory MEMmin, from among the memories MEM whose access counts are lower than the threshold. The memory MEMmin is recognized as a low-frequency memory whose access frequency is lower than those of other memories MEM.

Although not depicted in FIG. 10, when there is no memory MEM whose access count is lower than the threshold among the memories MEM assigned to the servers SV excluding the server SV that is assigned the memory MEMmax, the processes in S348, S350 are omitted, and the processing transfers to S352. The control device CTRL may select two memories MEM with the lowest access count as memories MEMmin.

In the example of the management table TBL2 depicted in FIG. 3, from among the memories MEM assigned to the servers SV1, SV2 excluding the server SV0 that is assigned the memory MEM0, the memory MEM3 with the lowest access count is selected as the memory MEMmin. When there are multiple memories MEM with the lowest access count, for example, the control device CTRL selects the memory MEM with the smallest-numbered ID as the memory MEMmin.

In S348, the control device CTRL rewrites the management table TBL2 in order to change the server SV that is assigned the memory MEMmax, to the server SV that is assigned the memory MEMmin. For example, the control device CTRL rewrites the ID of the server SV stored in the area of the server name SVID corresponding to the memory MEMmax, to the ID of the server SV assigned to the memory MEMmin. An example of rewriting of the management table TBL2 is depicted in FIG. 11.

In S350, the control device CTRL notifies the management device LB of the change of assignment of the memory MEMmax, via the server SV that is assigned the memory MEM with the lowest access count. For example, the control device CTRL notifies the server SV of all the query names that are stored in the management table TBL2 in association with the memory MEMmax. In S352, the control device CTRL resets all the access counts in the management table TBL2.

By assigning the memory MEM with a high access frequency to another server SV corresponding to the memory MEM with a low access frequency, as in the above-mentioned embodiment, the load on the server SV on which access is concentrated may be reduced, without the management device LB performing the process of determining which server SV to access. As a result, the performance of the information processing system IPS may be improved without increasing the load on the management device LB.

In a case where the processing by the control device CTRL is performed by a hardware logic, the operation of selecting the high-frequency memory MEMmax by S344 is performed by the detecting section 32 (first detecting section) of the control device CTRL. The operation of selecting the low-frequency memory MEMmin by S346 is performed by the detecting section 34 (second detecting section) of the control device CTRL. The operation of changing the server name SVID stored in the management table TBL2 by S348 is performed by the changing section 36 of the control device CTRL. The operation of notifying the management device LB of information about the management table TBL2 via the server SV by S350 is performed by the output section 38 of the control device CTRL. The output section 38 of the control device CTRL also has the function of outputting data read from one of the memories MEM0 to MEM9 in response to an access request, to the management device LB via the server SV.

When there is no memory MEM whose access count is higher than the threshold in S340, or when there is no memory MEM whose access count is lower than the threshold in S346, the control device CTRL does not change the management table TBL2. This is because when there is no noticeable difference in access count among individual memories MEM, even if the server SV that is assigned a particular memory MEM is changed, the reduction in the load on the server SV is small.

Figure 12:
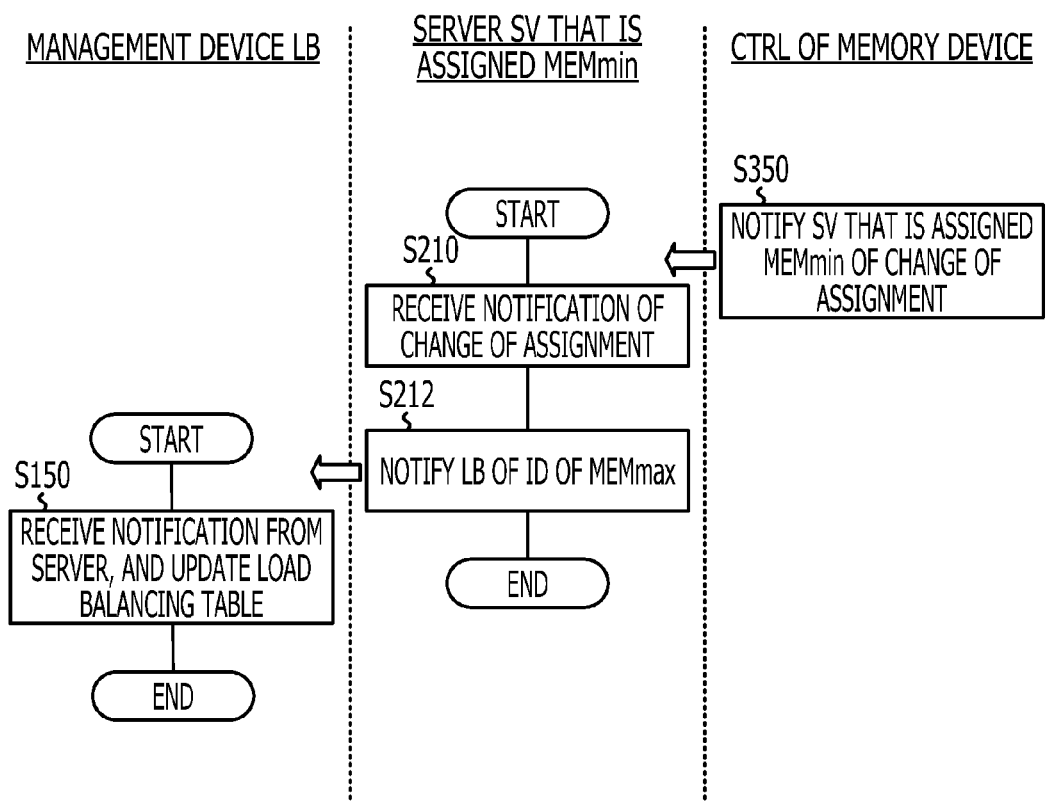
FIG. 12 depicts an example of an assignment changing operation in the load balancing operation of the information processing system depicted in FIG. 2.

In contrast, when changing assignment of the memory MEM, the control device CTRL, the server SV, and the management device LB perform the processing for changing assignment of the memory MEM depicted in FIG. 12. Accordingly, the processing capacity of the control device CTRL, the server SV, and the management device LB for access requests temporarily decreases. By determining whether or not to change assignment of the memory MEM on the basis of a threshold, changing of assignment of the memory MEM is inhibited when the reduction in the load on the server SV is small, thereby avoiding a decrease in the processing capacity for access requests.

When the load placed on the control device CTRL, the server SV, and the management device LB when changing assignment of the memory MEM is sufficiently smaller than the load placed when performing processing with respect to an access request, a threshold may not be used. In this case, assignment of the memory MEM with the highest access count is changed to another server SV that is assigned the memory MEM with the lowest access count.

FIG. 11 depicts an example of the management table TBL2 after the load balancing operation depicted in FIG. 10 is performed. For example, in the management table TBL2, the control device CTRL changes the server name SVID corresponding to the memory MEMmax (=MEM0) with the highest access count from SV0 to SV1. Thereafter, in S352 depicted in FIG. 10, the control device CTRL resets all the access counts in the management table TBL2 to zero. In FIG. 11, for the ease of understanding, the change from SV0 to SV1 is indicated by an arrow in the field of the server name SVID corresponding to the memory MEM0. Also, in the field of access count, resetting of the access count to zero is indicated by an arrow.

FIG. 12 depicts an example of an assignment changing operation in the load balancing operation of the information processing system IPS depicted in FIG. 2. As in FIG. 6, the processing by the management device LB is performed by the CPUa executing a program. As in FIG. 6, the processing by the server SV is performed by the CPUb executing a program. The processing by the management device LB and the processing by the server SV may be performed by hardware processing. The processing by the control device CTRL may be performed by the operation of a hardware logic, or a program executed by the control device CTRL.

The process in S350 performed by the control device CTRL is the same as S350 depicted in FIG. 10. In S210, the server SV that is assigned the memory MEMmin receives all the query names that are stored in the management table TBL2 in association with the memory MEMmax, as an assignment change notification from the control device CTRL. In S212, the server SV that is assigned the memory MEMmin notifies the management device LB of the query names received from the control device CTRL.

The server SV that is assigned the memory MEMmin is likely to be less frequently accessed than the server SV that is assigned the memory MEMmax. By performing changing of assignment by using the server SV that is assigned the memory MEMmin, placement of extra load on the server SV on which access is concentrated may be reduced, thereby avoiding a decrease in the processing efficiency of the server SV.

In S150, the management device LB receives the notification of the query names from the server SV that is assigned the memory MEMmin. The management device LB stores the received query names into the load balancing table TBL1. Then, for each of the query names, the management device LB stores the ID of the server SV from which the query name is received, into the area of the server name SVID. As a result, an access to the memory MEMmax is performed via the server SV that accesses the memory MEMmin, which is written in the server name SVID.

In a case where the processing by the management device LB is performed by a hardware logic, the operation of receiving information from the server SV in S150 is performed by the receiving section 12 of the management device LB. The operation of updating the load balancing table TBL1 on the basis of the information received from the server SV in S150 is performed by the storing section 14 of the management device LB.

Figure 13:
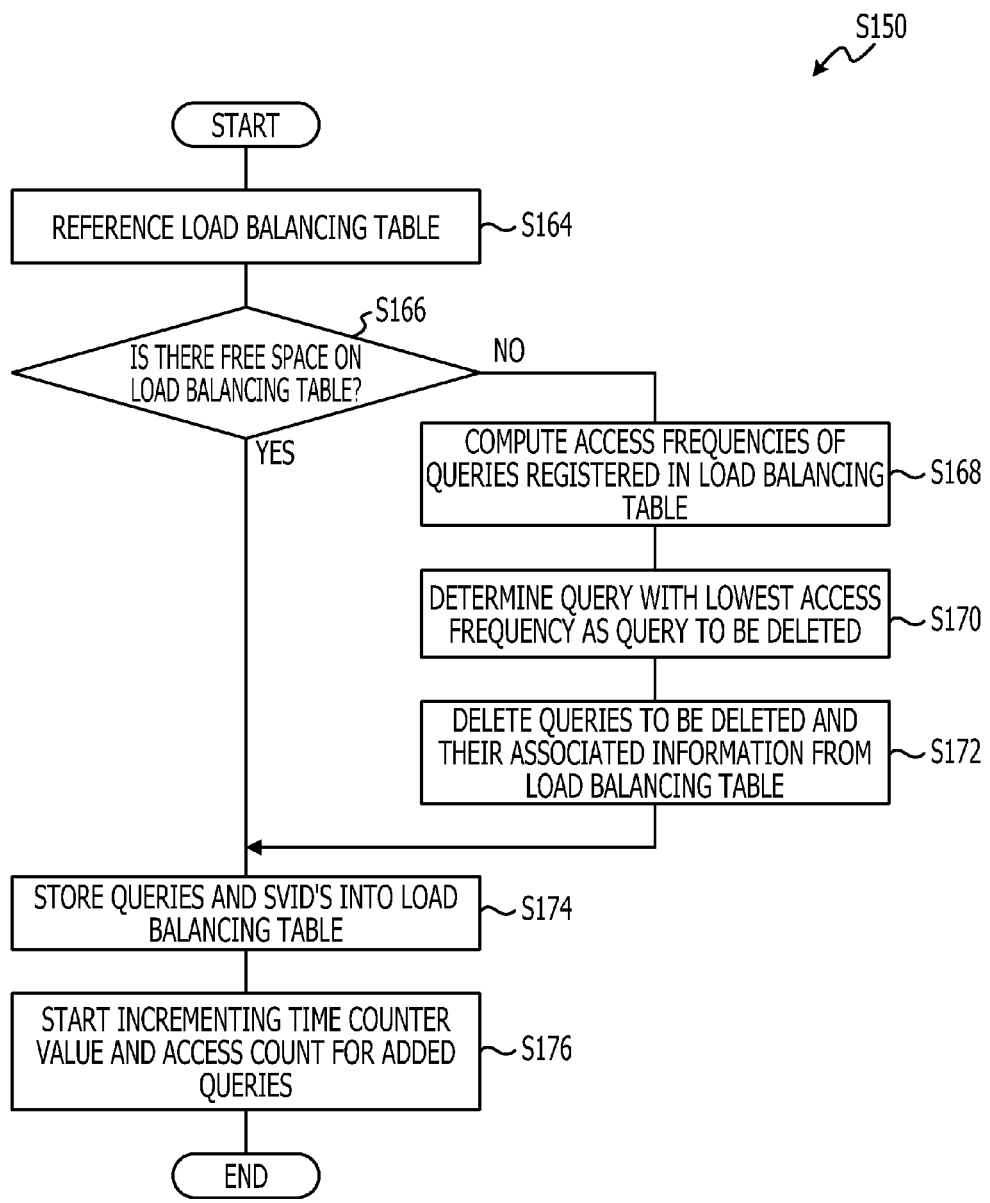
FIG. 13 depicts an example of the operation in S150 depicted in FIG. 12.

FIG. 13 depicts an example of the operation in S150 depicted in FIG. 12. The processing depicted in FIG. 13 is performed by the processor CPUa depicted in FIG. 2 executing a program. The processing depicted in FIG. 13 may be performed by hardware processing of the management device LB.

In S164, the management device LB receives a notification from the server SV, and references the load balancing table TBL1. In S166, the management device LB transfers the processing to S174 when there is more than enough free space on the load balancing table TBL1 for the number of queries received from the server SV. When there is not enough free space on the load balancing table TBL1 for the number of queries received from the server SV, the management device LB transfers the processing to S168.

In S168, the management device LB references the load balancing table TBL1, and for each query name, the management device LB divides the access count by the time counter value to compute access frequency. In S170, the management device LB determines the queries to be deleted, sequentially from the query with the lowest access frequency. At this time, the number of queries to be deleted is set equal to or more than the number of queries received from the server SV.

In S172, the management device LB deletes the queries to be deleted and their associated information, that is, server name SVID, time counter value, and access count, from the load balancing table TBL1. In S174, the management device LB stores the query names received from the server SV into the free space on the load balancing table TBL1. Then, for each query name, the management device LB registers the ID of the server SV from which a notification of the query name is received, as the server name SVID. In S176, the management device LB starts incrementing the time counter value and the access count for the newly stored query names.

As described above, also in this embodiment, as in the embodiment mentioned above, assignment of the high-frequency memory MEMmax may be changed from a given server SV to another server SV by referencing the load balancing table TBL1, without the management device LB performing a process such as determining the server SV to which to output an access request. As a result, the load on the server SV on which access is concentrated may be reduced without increasing the load on the management device LB, thereby improving the performance of the information processing system IPS.

Further, by determining whether or not to change assignment of the memory MEM on the basis of a threshold, changing of assignment of the memory MEM may be inhibited when the reduction of load on the server SV is small. Therefore, it is possible to avoid a situation where the processing capacity of the management device LB and the server SV for access requests decreases owing to changing of assignment of the memory MEM.

When there is no free space on the load balancing table TBL1, the management device LB deletes queries with low access frequencies, and information corresponding to the queries from the load balancing table TBL1. This allows the management device LB to register the server name SVID for which assignment of the memory MEM is to be changed, into the load balancing table TBL1 on the basis of the latest access frequency on the server SV. As a result, assignment of the memory MEM may be changed in accordance with the current access concentration, thereby improving the performance of the information processing system IPS.

Figure 14:
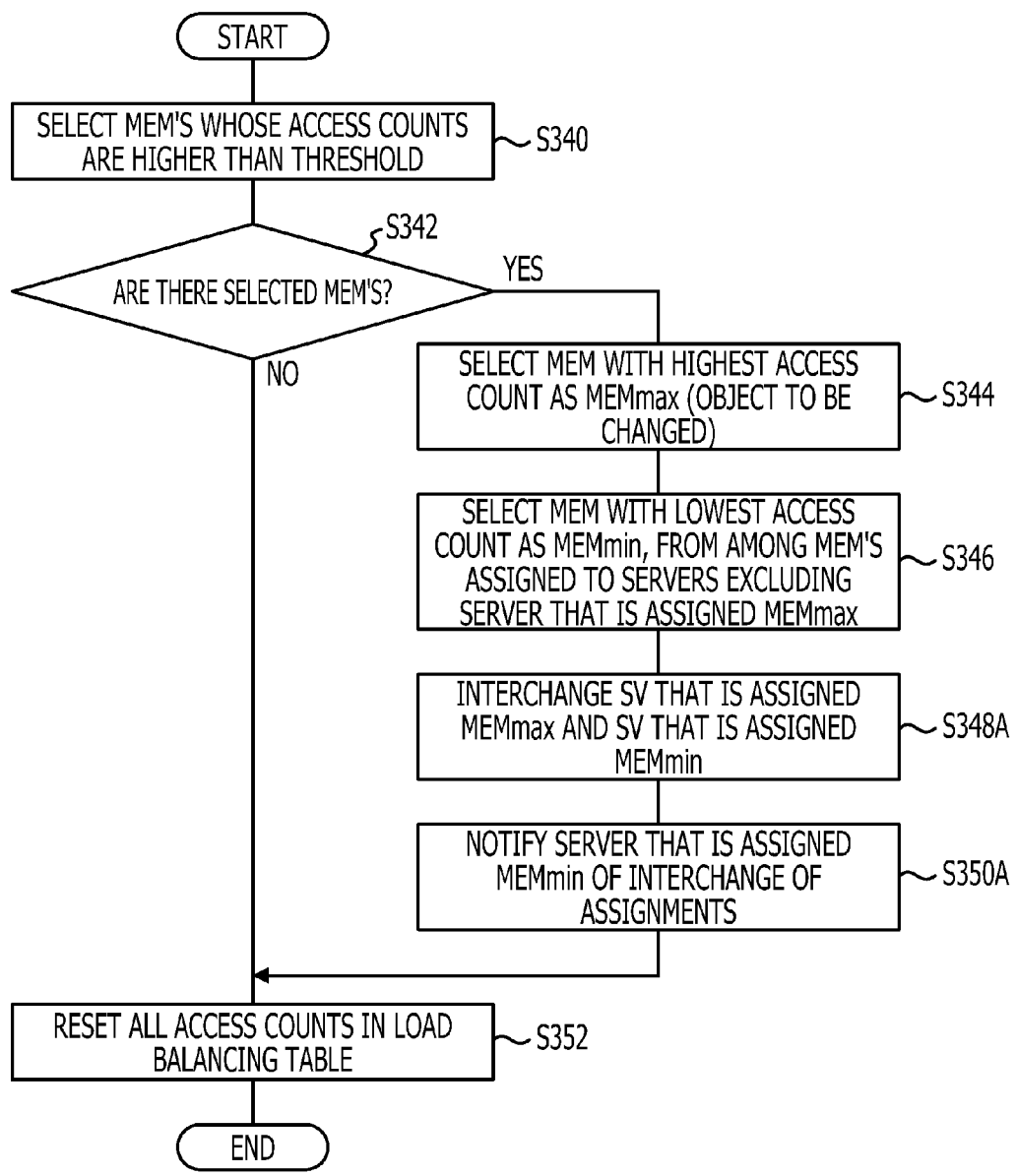
FIG. 14 depicts an example of the operation of the control device in the load balancing operation of the information processing system according to another embodiment.

FIG. 14 depicts an example of the operation of the control device CTRL in the load balancing operation of the information processing system IPS according to another embodiment. Elements that are the same as the elements described with reference to the above-mentioned embodiments are denoted by the same symbols, and a detailed description is omitted for these elements.

In this embodiment, assignments are interchanged between the server SV that accesses the memory MEMmax with the highest access count, and the server SV that accesses the memory MEMmin with the lowest access count. Accordingly, the assignment changing operation in the load balancing operation performed by the management device LB, the servers SV0 to SV2, and the control device CTRL depicted in FIG. 2 differs from FIGS. 10 and 12. The processing other than the assignment changing operation in the load balancing operation is the same as in the above-mentioned embodiments. That is, the configuration of the information processing system IPS is the same as in FIG. 2.

Since S340, S342, S344, S346, S352 are the same as the processes depicted in FIG. 10, their description is omitted. In S348A, the control device CTRL rewrites the server name SVID in the management table TBL2 so that the server SV that is assigned the memory MEMmax and the server SV that is assigned the memory MEMmin are interchanged. An example of rewriting of the management table TBL2 is depicted in FIG. 15.

Next, in S350A, the control device CTRL notifies the management device LB of the fact that the servers SV to which to assign the memory MEMmin and the memory MEMmax are to be interchanged, via the server SV that is assigned the memory MEMmin. That is, the server SV that is assigned the memory MEMmin is notified of the fact that the memory MEMmin is to be accessed by the server SV that is assigned the memory MEMmax. For example, the server SV that is assigned the memory MEMmin is notified of the server names SVID whose assignments have been interchanged, and query names that are stored in the management table TBL2 in association with the respective server names SVID.

In a case where the processing by the control device CTRL is performed by a hardware logic, the operation of rewriting the server name SVID in the management table TBL2 by S348A is performed by the changing section 36 of the control device CTRL. The operation of notifying the management device LB of information on the management table TBL2 via the server SV by S350A is performed by the output section 38 of the control device CTRL.

FIG. 15 depicts an example of the management table TBL2 after the load balancing operation depicted in FIG. 14 is performed. In this embodiment, as in FIG. 11, assignment of the memory MEM0 is changed from the server SV0 to the server SV1. Then, assignment of the memory MEM0 is changed from the server SV1 to the server SV0. Other pieces of information stored in the management table TBL2 are the same as in FIG. 11. Resetting of the access counts to zero is performed by S352 depicted in FIG. 14.

Figure 16:
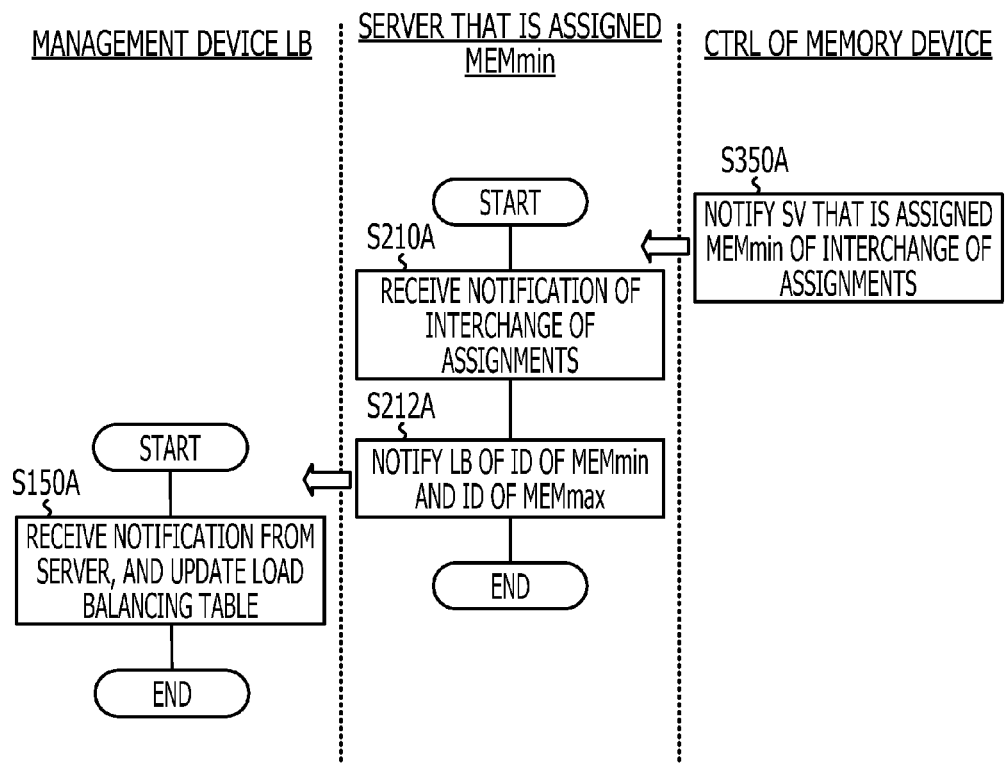
FIG. 16 depicts an example of the assignment changing operation by the management device and the server due to S350A depicted in FIG. 14.

FIG. 16 depicts an example of the assignment changing operation by the management device LB and the server SV due to S350A depicted in FIG. 14. As in FIGS. 6 and 12, the processing by the management device LB is performed by the CPUa executing a program. The processing by the server SV is performed by the CPUb executing a program. The processing by the management device LB and the processing by the server SV may be performed by hardware processing. The processing by the control device CTRL may be performed by the operation of a hardware logic, or a program executed by the control device CTRL.

S350A is the same process as S350A depicted in FIG. 14. S350A is a process corresponding to S350 depicted in FIG. 12. S210A, S212A are processes corresponding to S210, S212 depicted in FIG. 12. S150A is a process corresponding to S150 depicted in FIG. 12.

In S210A, the server SV that is assigned the memory MEMmin receives, from the control device CTRL, the server names SVID that are newly assigned to the memories MEMmin, MEMmax whose assignments are to be interchanged, and the query names corresponding to the respective server names SVID. In S212A, the server SV that is assigned the memory MEMmin notifies the management device LB of the server names SVID to be newly assigned, and the query names corresponding to the respective server names SVID.

In S150A, as in S150 depicted in FIG. 12, the management device LB receives the notification from the server SV that is assigned the memory MEMmin, and stores the query names and the server names SVID into the load balancing table TBL1. In a case where the processing by the management device LB is performed by a hardware logic, the operation in S150 is performed by the receiving section 12 and the storing section 14 of the management device LB.

FIG. 17 depicts an example of the load balancing table TBL1 after the load balancing operation depicted in FIG. 16 is performed. This example depicts the load balancing table TBL1 that has been changed (after elapse of a time counter value of 30) in accordance with the changes to the management table TBL2 depicted in FIG. 15. That is, through S150A depicted in FIG. 16, the management device LB sets information indicating that the memory MEMmax (e.g. Queries A, B, C of MEM0) is to be accessed by the server SV1, in the load balancing table TBL1. Likewise, through S150A depicted in FIG. 16, the management device LB sets information indicating that the memory MEMmin (e.g. Queries J, K, L of MEM3) is to be accessed by the server SV0, in the load balancing table TBL1.

When the management device LB receives an access request for Query A, the management device LB references the load balancing table TBL1, and transmits the access request to the control device CTRL via the server SV1 with a relatively small load. When the management device LB has received an access request for Query J, the management device LB references the load balancing table TBL1, and transmits the access request to the control device CTRL via the server SV0 with a relatively large load.

The server SV0 with a relatively large load handles accesses to Queries J, K, L with low access frequencies, instead of accesses to Queries A, B, C with high access frequencies. The server SV1 with a relatively small load handles accesses to Queries A, B, C with high access frequencies, instead of accesses to Queries J, K, L with low access frequencies. The memories assigned to the server SV0 have been changed to MEM1, MEM2, MEM3. The memories assigned to the server SV1 have been changed to MEM0, MEM4, MEM5. Therefore, a part of the load on the server SV0 may be transferred to the server SV1, thereby reducing variations in load among the servers SV0 to SV2.

As described above, also in this embodiment, as in the embodiment mentioned above, assignment of the high-frequency memory MEMmax may be changed from a given server SV to another server SV, thereby reducing the load on the server SV on which access is concentrated, without increasing the load on the management device LB. By determining whether or not to change assignment of the memory MEM on the basis of a threshold, changing of assignment of the memory MEM may be inhibited when the reduction of load on the server SV is small. Moreover, it is possible to avoid a situation where the processing capacity of the management device LB and the server SV for access requests decreases owing to changing of assignment of the memory MEM. When there is no free space on the load balancing table TBL1, by deleting queries with low access frequencies from the load balancing table TBL1, assignment of the memory MEM may be changed in accordance with the current access concentration, thereby improving the performance of the information processing system IPS.

Further, by interchanging assignments of memories MEM to servers SV in accordance with the access frequency, variations in load among the servers SV0 to SV2 may be reduced, thereby improving the performance of the information processing system IPS.

Figure 18:
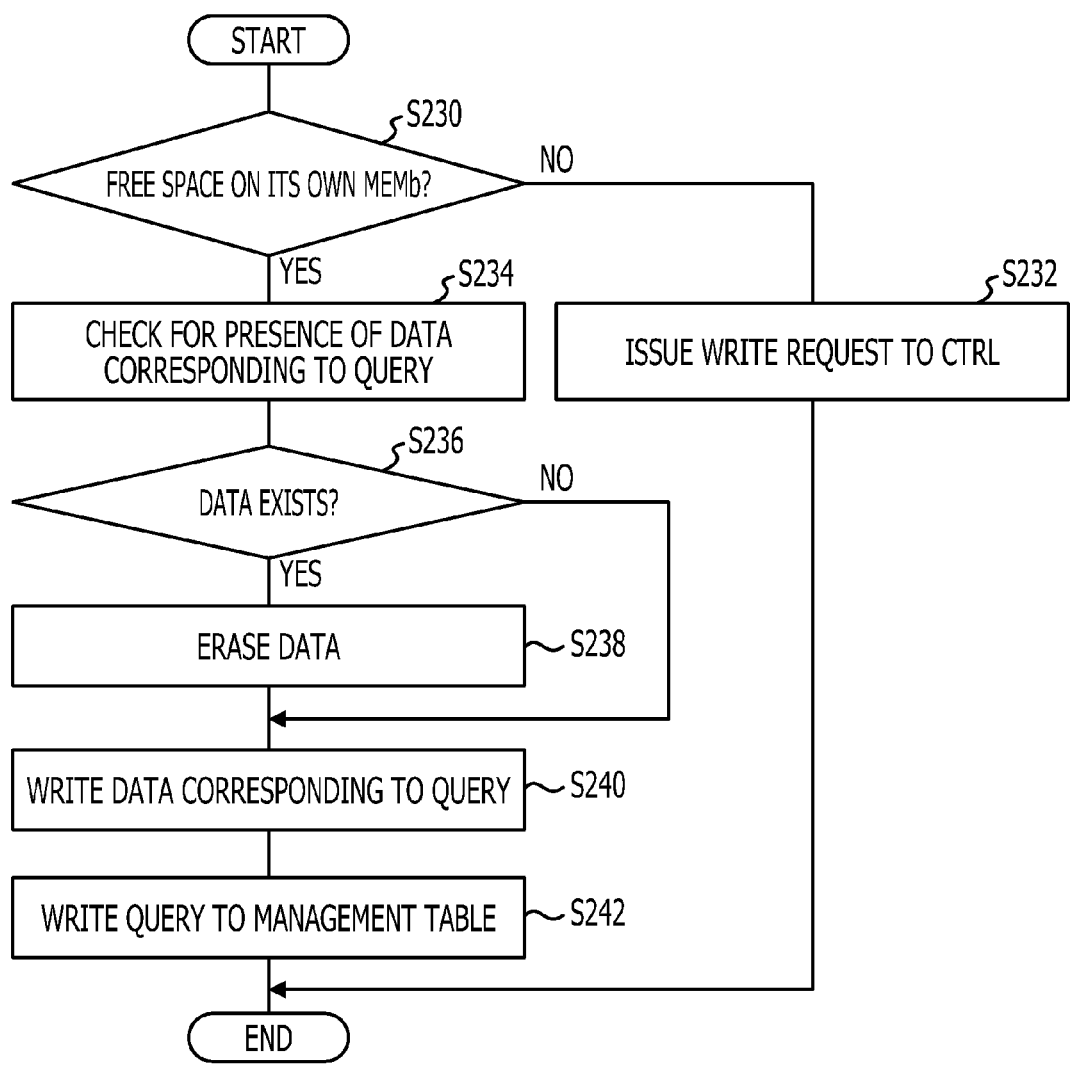
FIG. 18 depicts an example of a write operation by the server according to another embodiment.

FIG. 18 depicts an example of a write operation by each of the servers SV0 to SV2 according to another embodiment. Elements that are the same as the elements described with reference to the above-mentioned embodiments are denoted by the same symbols, and a detailed description is omitted for these elements.

In this embodiment, data is stored not only in the memories MEM0 to MEM9 of the memory device MD depicted in FIG. 2, but also in the memory MEMb of each of the servers SV0 to SV2. Accordingly, the operation of the servers SV0 to SV2 depicted in FIG. 2 differs from the above-mentioned embodiments. Processing other than accessing of the memory MEMb by each of the servers SV0 to SV2 is the same as in the above-mentioned embodiments. That is, the configuration of the information processing system IPS is the same as in FIG. 2.

In the above-mentioned embodiments, each of the servers SV0 to SV2 transmits a write request and a read request from the management device LB to the control device CTRL. Then, each of the servers SV0 to SV2 transmits data from the control device CTRL to the management device LB. That is, in the above-mentioned embodiments, each of the servers SV0 to SV2 does not perform writing and reading of data to and from its own memory MEMb.

FIG. 18 is a flowchart of the operation of each of the servers SV0 to SV2 that responds to the write request due to S118 depicted in FIG. 7. For example, the processing by the server SV depicted in FIG. 18 is performed by the processor CPUb depicted in FIG. 2 executing a program. The operation of the server SV may be performed by hardware processing.

First, in S230, the server SV determines whether or not there is free space on its own memory MEMb. The server SV transfers the processing to S232 when there is no free space on the memory MEMb, transmits the write request to the control device CTRL, and ends the processing. The operation of the control device CTRL upon receiving the write request from the server SV is depicted in FIG. 9.

When there is free space on its own memory MEMb, in S234, the server SV checks whether or not data corresponding to a query received together with the write request is stored in the memory MEMb. The server SV includes a query table for determining the block area in which data is stored within the memory MEMb on the basis of a query. For example, like the query name area depicted in FIG. 3, the query table includes an area in which to store a query name in association with each block area of the memory MEMb.

In S236, when data corresponding to the query exists in the memory MEMb, the server SV transfers the processing to S238. When data corresponding to the query does not exist in the memory MEMb, the server SV transfers the processing to S240. In S238, the server SV erases the data that is stored in the memory MEMb in association with the query. The server SV may invalidate the corresponding data without erasing the data. In S240, the server SV writes data received from the management device LB together with the query, to a predetermined block area of the memory MEMb.

Figure 19:
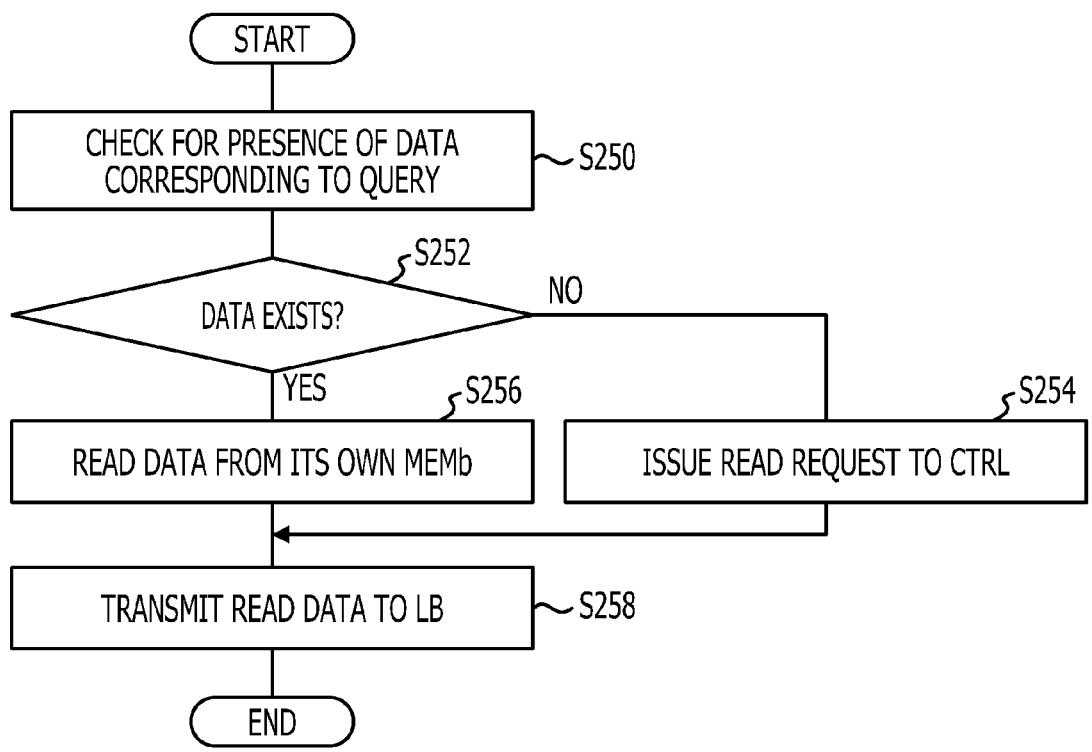
FIG. 19 depicts an example of a read operation by the server that performs the write operation depicted in FIG. 18.

FIG. 19 depicts an example of a read operation by each of the servers SV0 to SV2 that performs the write operation depicted in FIG. 18. FIG. 19 depicts the operation of each of the servers SV0 to SV2 that responds to the read request due to S138 depicted in FIG. 8. For example, the processing by the server SV depicted in FIG. 19 is performed by the processor CPUb depicted in FIG. 2 executing a program. The operation of the server SV may be performed by hardware processing.

First, in S250, the server SV checks whether or not data corresponding to a query received together with the read request is stored in the memory MEMb. In S252, when data corresponding to the query exists in the memory MEMb, the server SV transfers the processing to S256. When data corresponding to the query does not exist in the memory MEMb, the server SV transfers the processing to S254.

In S254, the server SV transmits the read request to the control device CTRL, and ends the processing. The operation of the control device CTRL upon receiving the read request from the server SV is depicted in FIG. 9. In S256, the server SV reads data corresponding to the query from its own memory MEMb. In S328, the server SV transmits the data read from the memory MEMb or data read from the memory MEM of the memory device MD to the management device LB.

The servers SV0 to SV2 according to the embodiment depicted in FIGS. 14 to 17 may be caused to perform the processing depicted in FIGS. 18 and 19. At this time, each of the servers SV0 to SV2 stores data corresponding to a query into the memory MEMb and one of the memories MEM0 to MEM9, and reads data from the memory MEMb and one of the memories MEM0 to MEM9.

As described above, also in this embodiment, as in the embodiments mentioned above, assignment of the high-frequency memory MEMmax may be changed from a given server SV to another server SV, thereby reducing the load on the server SV on which access is concentrated, without increasing the load on the management device LB. By determining whether or not to change assignment of the memory MEM on the basis of a threshold, changing of assignment of the memory MEM may be inhibited when the reduction of load on the server SV is small. Thus, it is possible to avoid a situation where the processing capacity of the management device LB and the server SV for access requests decreases owing to changing of assignment of the memory MEM.

When there is no free space on the load balancing table TBL1, by deleting queries with low access frequencies from the load balancing table TBL1, assignment of the memory MEM may be changed in accordance with the current access concentration, thereby improving the performance of the information processing system IPS. By interchanging assignments of memories MEM to servers SV in accordance with the access frequency, variations in load among the servers SV0 to SV2 may be reduced.

Further, in the information processing system IPS that stores data in the memory MEM of the memory device MD and the memory MEMb of the server SV, the load on the server SV on which access is concentrated may be reduced without increasing load on the management device LB and the server SV.

Figure 20:
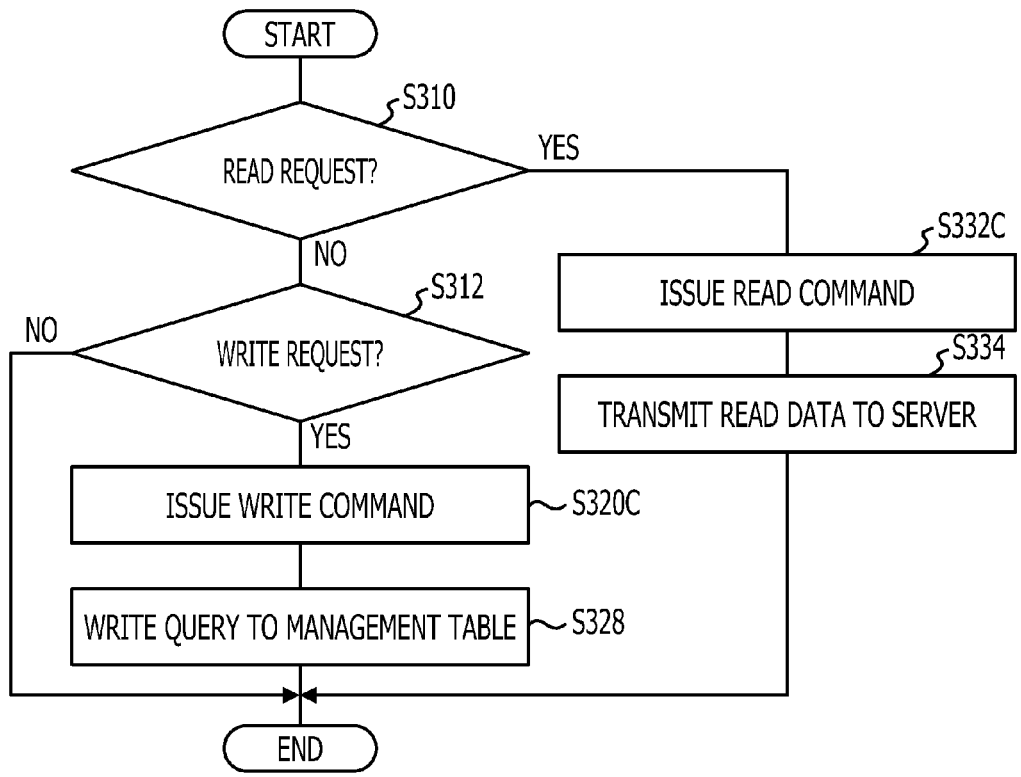
FIG. 20 depicts an example of the operation of the control device according to another embodiment.

FIG. 20 depicts an example of the operation of the control device CTRL according to another embodiment. Elements that are the same as the elements described with reference to the above-mentioned embodiments are denoted by the same symbols, and a detailed description is omitted for these elements.

In this embodiment, the control device CTRL depicted in FIG. 2 accesses the memories MEM0 to MEM9 by using a memcached program (library). Accordingly, the write operation and read operation of data by the control device CTRL differ from FIG. 9. Memcached refers to a distributed memory cache server program that holds the results of access to a database or the like to reduce the number of times the database is to be accessed, thereby achieving faster Web access.

The operations of the management device LB and server SV, and the load balancing operation by the control device CTRL are the same as in the embodiment depicted in FIGS. 2 to 13. That is, the configuration of the information processing system IPS is the same as in FIG. 2. For example, the control device CTRL is a microcontroller or processor CPU with embedded ROM and RAM. In the ROM or RAM, the memcached program, and a control program for activating the memcached program are stored. FIG. 20 depicts the processing performed by the control program.

By executing the memcached program, the memories MEM0 to MEM9 each function as a cache server for the database DB. In the following description, memcached will be used not only as a program but also as the name of a cache server, that is, the name of a memcached system that operates as a cache server.

For example, memcached finds a hash value by using a query supplied together with each of a read request and a write request from each of the servers SV0 to SV2. For each of the servers SV0 to SV2, memcached divides the found hash value by the number of memories MEM, and determines the memory MEM to access from the remainder. For example, when a read request is received from the server SV0, memcached accesses the memory MEM (one of MEM0 to MEM2) with an ID indicated by the remainder obtained by dividing the hash value by "3". When a read request is received from the server SV1, memcached accesses the memory MEM (one of MEM3 to MEM5) whose ID has a value obtained by adding "3" to the remainder obtained by dividing the hash value by "3".

In FIG. 20, the processes in S310, S312, S328, S334 are the same processes as S310, S312, S328, S334 in FIG. 9. In FIG. 20, the processing performed by memcached is not depicted. For example, S314, S316, S318, S320, S322, S324, S326 depicted in FIG. 9 are performed by memcached. Accordingly, the control program of the control device CTRL may simply transmit a "write command (set command)" to memcached in S320C, instead of S314, S316, S318, S320, S322, S324, S326 depicted in FIG. 9.

By inserting "expires (expiration time; timestamp or number of seconds)" into the parameter of the set command, data past the expiration time is handled as invalid data by memcached. By using this function, the frequency with which the memory MEM becomes full may be reduced even when data is frequently written, thereby reducing the frequency of erase operations by the LRU method performed by memcached when the memory MEM becomes full.

Since S330 depicted in FIG. 9 is normally performed by memcached, the control program of the control device CTRL may simply transmit a "read command (get command)" to memcached in S332C, instead of S330 depicted in FIG. 9.

As described above, also in this embodiment, as in the embodiments mentioned above, assignment of the high-frequency memory MEMmax may be changed from a given server SV to another server SV, thereby reducing the load on the server SV on which access is concentrated, without increasing the load on the management device LB. By determining whether or not to change assignment of the memory MEM on the basis of a threshold, changing of assignment of the memory MEM may be inhibited when the reduction of load on the server SV is small. In addition, it is possible to avoid a situation where the processing capacity of the management device LB and the server SV for access requests decreases owing to changing of assignment of the memory MEM.

When there is no free space on the load balancing table TBL1, by deleting queries with low access frequencies from the load balancing table TBL1, assignment of the memory MEM may be changed in accordance with the current access concentration, thereby improving the performance of the information processing system IPS. By interchanging assignments of memories MEM to servers SV in accordance with the access frequency, variations in load among the servers SV0 to SV2 may be reduced. In the information processing system IPS that stores data in the memory MEM of the memory device MD and the memory MEMb of the server SV, the load on the server SV on which access is concentrated may be reduced without increasing load on the management device LB and the server SV.

Further, by using the memcached program, in the information processing system IPS that accesses the memories MEM0 to MEM9, the load on the server SV on which access is concentrated may be reduced without increasing load on the management device LB and the server SV.

The control device CTRL according to the embodiment depicted in FIGS. 14 to 17 may be caused to execute the memcached program to perform the processing depicted in FIG. 20.

Further, when each of the servers SV0 to SV2 is designed to store data corresponding to a query into the memory MEMb as depicted in FIGS. 18 and 19, memcached may be incorporated into each of the servers SV0 to SV2. At this time, the processor CPUb of each of the servers SV0 to SV2 executes the memcached program for accessing the memory MEMb, and a control program for controlling memcached and access to the memory MEM.

The control program performs the same processing as the processing depicted in FIGS. 18 and 19. However, S230, S234, S240 depicted in FIG. 18 and S250, S256 depicted in FIG. 19 are performed by transmitting a command to memcached. S236, S238 depicted in FIG. 18 are each realized by a function implemented in memcached.

Figure 21:
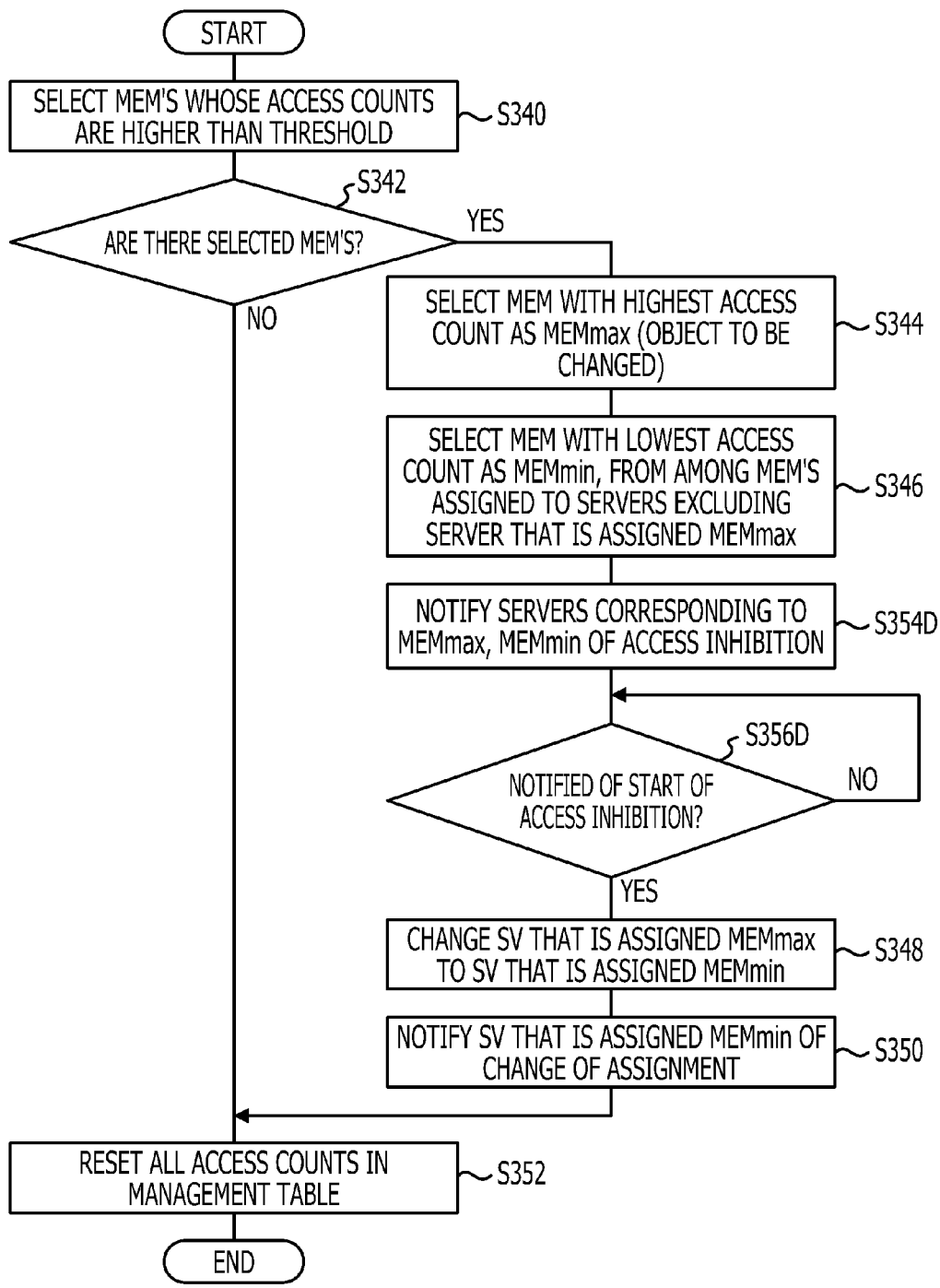
FIG. 21 depicts an example of the load balancing operation in the information processing system according to another embodiment.
Figure 22:
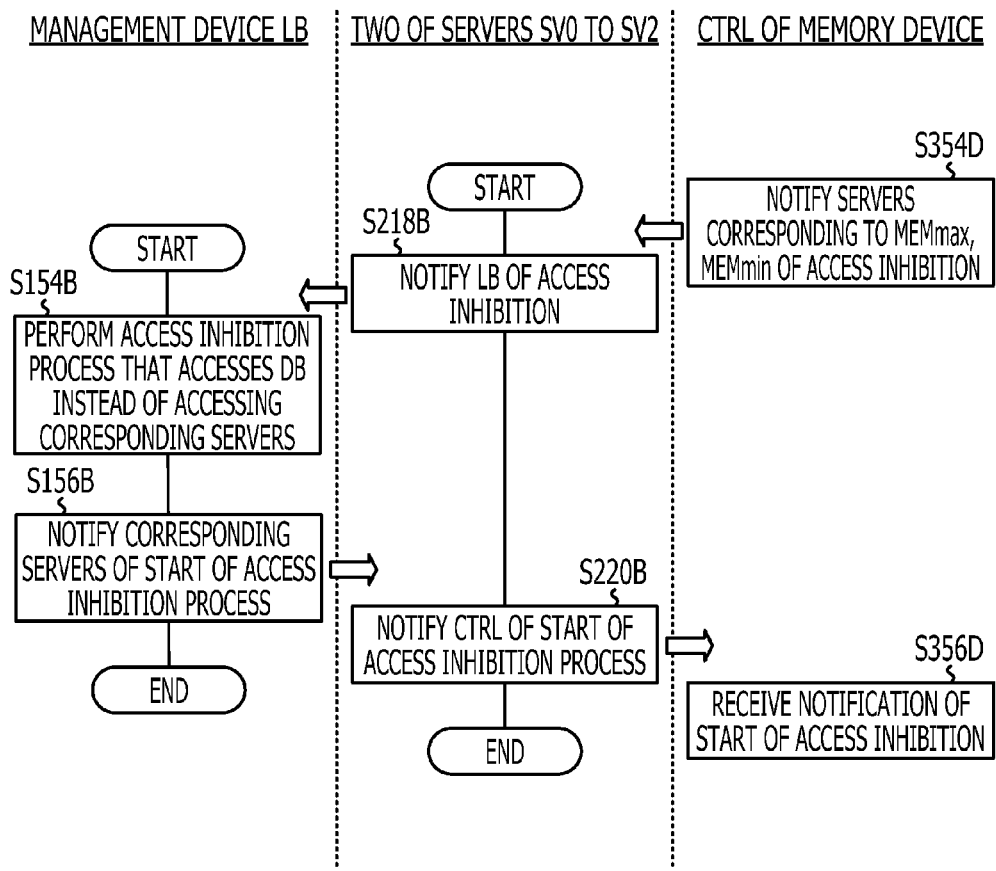
FIG. 22 depicts an example of an access inhibition process at the time of changing assignment in the load balancing operation depicted in FIG. 21.
Figure 23:
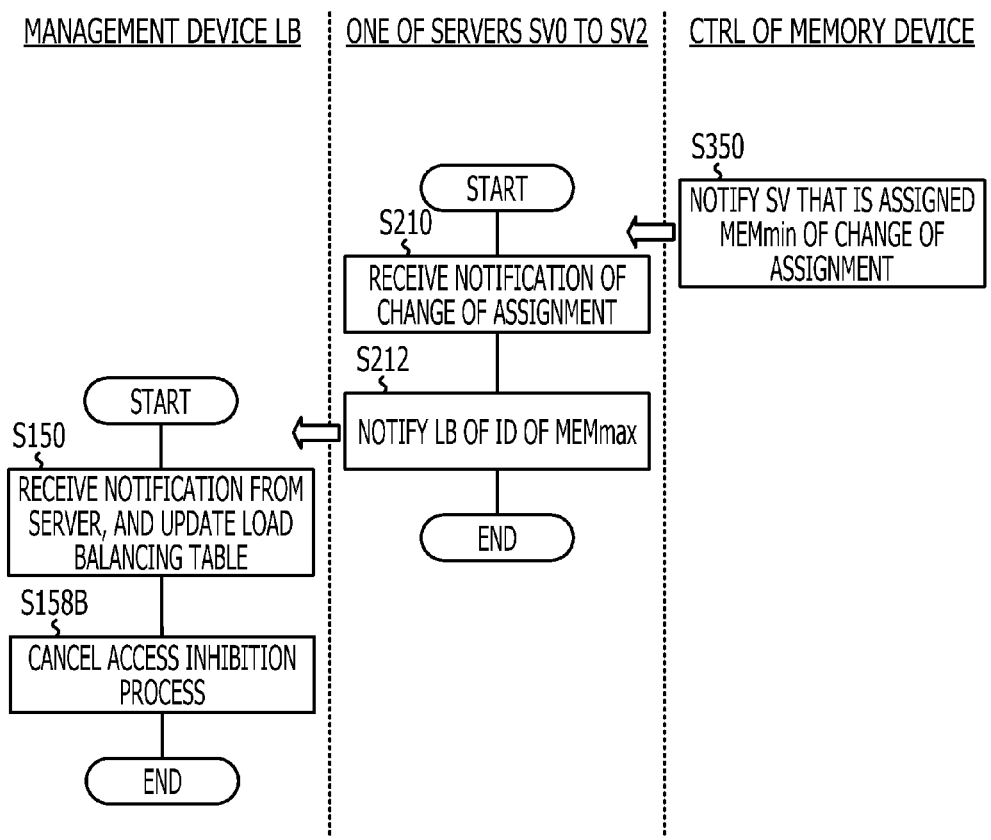
FIG. 23 depicts an example of the assignment changing operation in the load balancing operation depicted in FIG. 21.

FIGS. 21, 22, 23 each depict an example of a load balancing operation in the information processing system IPS according to another embodiment. Elements that are the same as the elements described with reference to the above-mentioned embodiments are denoted by the same symbols, and a detailed description is omitted for these elements.

In this embodiment, access to the memory MEM is inhibited during the period from changing of the management table TBL2 to updating of the load balancing table TBL1 by a load balancing operation. Accordingly, the assignment changing operation in the load balancing operation performed by the management device LB, the servers SV0 to SV2, and the control device CTRL depicted in FIG. 2 differs from FIGS. 10 and 12. Processing other than the assignment changing operation in the load balancing operation is the same as in the above-mentioned embodiments. That is, the configuration of the information processing system IPS is the same as in FIG. 2.

FIG. 21 depicts an example of the operation of the control device CTRL in the load balancing operation. The processing by the control device CTRL is performed by the operation of a hardware logic, or a program executed by the control device CTRL.

In this example, S354D, S356D are inserted between S346, S348. S340, S342, S344, S346, S348, S350, S352 are the same processes as in FIG. 10.

In S354D, the control device CTRL notifies the servers SV corresponding to the memories MEMmax, MEMmin of inhibition of access to the memory device MD. Next, in S356D, the control device CTRL waits for a notification indicating that access inhibition has been started from the management device LB via the server SV. Upon receiving the notification that access inhibition has been started from the management device LB, the control device CTRL transfers the processing to S348. Therefore, the control device CTRL does not change the management table TBL2 until the management device LB starts access inhibition, thereby ensuring that there is no period during which the load balancing table TBL1 and the management table TBL2 do not match.

FIG. 22 depicts an example of an access inhibition process at the time of changing assignment in the load balancing operation depicted in FIG. 21. The processing by the management device LB is performed by the CPUa executing a program. The processing by the server SV is performed by the CPUb executing a program. The processing by the management device LB and the processing by the server SV may be performed by hardware processing.

The processes in S354D, S356D performed by the control device CTRL are the same as the processes in S354D, S356D depicted in FIG. 21. In S218B, each of the servers SV that are assigned the memories MEMmax, MEMmin notifies the management device LB of a notification of access inhibition from the control device CTRL.

In S154B, the management device LB receives the notification from each of the servers SV, and accesses the database DB instead of accessing the server SV from which the notification is received. That is, an access inhibition process with respect to the memories MEMmax, MEMmin is performed. The management device LB may perform an access inhibition process by suspending accesses to the servers SV that are assigned the memories MEMmax, MEMmin. In S156B, the management device LB notifies the servers SV that are assigned the memories MEMmax, MEMmin of the fact that the access inhibition process has been started.

In S220B, each of the servers SV that are assigned the memories MEMmax, MEMmin notifies the control device CTRL of the notification of the start of the access inhibition process from the management device LB. Then, in S356B, the control device CTRL receives the notification of the start of the access inhibition process from the management device LB via the server SV.

FIG. 23 depicts an example of an assignment changing operation in the load balancing operation depicted in FIG. 21. The processing by the management device LB is performed by the CPUa executing a program. The processing by the server SV is performed by the CPUb executing a program. The processing by the management device LB and the processing by the server SV may be performed by hardware processing.

In this example, S158B is added after the process in S150 performed by the management device LB depicted in FIG. 12.

The processes in S350, S210, S212, S150 are the same as the processes in S350, S210, S212, S150 depicted in FIG. 12.

In S158B, the management device LB cancels the access inhibition process after updating the load balancing table TBL1. Therefore, access requests for the servers SV that are assigned the memories MEMmax, MEMmin are resumed. In a case where access requests to the servers SV that are assigned the memories MEMmax, MEMmin are suspended by the access inhibition process, after S158B, the management device LB sequentially transmits the suspended access requests to the servers SV. Through the above-mentioned processing, it is possible to avoid a situation where an access request is transmitted to the server SV in a state in which the server names SVID registered in the load balancing table TBL1 and the management table TBL2 do not match. In addition, it is possible to reduce occurrence of a read error of data by the control device CTRL.

In contrast, suppose that the information processing system IPS receives an access request for the memory MEMmax (e.g. MEM0) between the process in S350 and the process in S150 depicted in FIG. 12. At this time, the load balancing table TBL1 has not been updated. Accordingly, the management device LB transmits the access request to the control device CTRL via the server SV (e.g. SV0) that is assigned the memory MEMmax.

However, in the management table TBL2 depicted in FIG. 11, assignment of the memory MEM0 has been changed from the server SV0 to the server SV1. Accordingly, the server SV to which to transmit the access request, and the server name SVID in the management table TBL2 do not match, and thus the control device CTRL is unable to perform reading of data. Because it is not possible to read correct data, the control device CTRL notifies the management device LB of a read error (corresponding to cache miss) via the server SV. The management device LB receives the read error from the control device CTRL, and accesses the database DB.

S348A, S350A in FIG. 14 may be performed instead of S348, S350 in FIG. 21, and S210A, S212A, S150A in FIG. 16 may be performed instead of S210, S212, S150 in FIG. 23. Therefore, in the information processing system IPS that interchanges two servers SV that are assigned two memories MEM with each other by a load balancing operation, access to the server SV during the load balancing operation may be inhibited.

Further, the load balancing operation according to the embodiment depicted in FIGS. 20 to 23 may be applied to the embodiment depicted in FIGS. 20 and 21 which incorporates the function of memcached.

As described above, also in this embodiment, as in the embodiments mentioned above, assignment of the high-frequency memory MEMmax may be changed from a given server SV to another server SV, thereby reducing the load on the server SV on which access is concentrated, without increasing the load on the management device LB. By determining whether or not to change assignment of the memory MEM on the basis of a threshold, changing of assignment of the memory MEM may be inhibited when the reduction of load on the server SV is small. In addition, it is possible to avoid a situation where the processing capacity of the management device LB and the server SV for access requests decreases owing to changing of assignment of the memory MEM.

When there is no free space on the load balancing table TBL1, by deleting queries with low access frequencies from the load balancing table TBL1, assignment of the memory MEM may be changed in accordance with the current access concentration, thereby improving the performance of the information processing system IPS. By interchanging assignments of memories MEM to servers SV in accordance with the access frequency, variations in load among the servers SV0 to SV2 may be reduced. In the information processing system IPS that stores data in the memory MEM of the memory device MD and the memory MEMb of the server SV, the load on the server SV on which access is concentrated may be reduced without increasing load on the management device LB and the server SV. By using the memcached program, in the information processing system IPS that accesses the memories MEM0 to MEM9, the load on the server SV on which access is concentrated may be reduced without increasing load on the management device LB and the server SV.

Further, in this embodiment, the management table TBL2 is changed after the management device LB starts access inhibition and the access inhibition is canceled after the load balancing table TBL1 is updated. Therefore, it is possible to avoid a situation where an access request is transmitted to the server SV in a state in which the load balancing table TBL1 and the management table TBL2 do not match, and it is possible to reduce occurrence of a read error of data by the control device CTRL.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device which receives an access request from a host transmitted via one of a plurality of information processing devices, from a management device, and accesses, among a plurality of memories, a memory corresponding to the information processing device via which the access request is transmitted, the control device comprising:
   a storage to store correspondence information indicating a correspondence between each of the memories and each of the information processing devices; and
   a processor to execute an operation including:
   detecting a first memory from among the memories, the first memory being a memory whose access frequency exceeds a predetermined access frequency or is relatively high,
   detecting a second memory from among the memories, the second memory being a memory whose access frequency is lower than or equal to a predetermined access frequency,
   changing the correspondence information so that an information processing device corresponding to the first memory changes from a first information processing device to a second information processing device corresponding to the second memory, and
   notifying the management device of the changed correspondence information, and outputting data read from the first memory to the management device via the second information processing device.

2. The control device according to claim 1, wherein the operation further includes:
   changing the correspondence information so that an information processing device corresponding to the second memory changes from the second information processing device to the first information processing device; and outputting data read from the second memory to the management device via the first information processing device.

3. The control device according to claim 1, further comprising:

a counting circuit to count an access count, the access count indicating a number of times each of the memories has been accessed by the information processing devices, wherein the operation further includes:

detecting a memory whose access count counted by the counting circuit is highest among the memories as the first memory, and detecting a memory whose access count counted by the counting circuit is lowest among the memories as the second memory.

4. The control device according to claim 1, wherein the operation further includes:

causing the management device to inhibit transmission of an access request, before changing the correspondence information; and notifying the changed correspondence information to the management device, after receiving from the management device a notification indicating that transmission of the access request is to be inhibited.

5. A control method for a control device that receives an access request from a host transmitted via one of a plurality of information processing devices, from a management device, and accesses, among a plurality of memories, a memory corresponding to the information processing device via which the access request is transmitted, the method comprising:

storing correspondence information indicating a correspondence between each of the memories and each of the information processing devices;

detecting a first memory from among the memories, the first memory being a memory whose access frequency exceeds a predetermined access frequency or is relatively high;

detecting a second memory from among the memories, the second memory being a memory whose access frequency is lower than or equal to a predetermined access frequency;

changing the correspondence information so that an information processing device corresponding to the first memory changes from a first information processing device to a second information processing device corresponding to the second memory; and notifying the management device of the changed correspondence information, and outputting data read from the first memory to the management device via the second information processing device.

6. The control method for a control device according to claim 5, further comprising:

changing the correspondence information so that an information processing device corresponding to the second memory changes from the second information processing device to the first information processing device; and outputting data read from the second memory to the management device via the first information processing device.

7. A non-transitory computer-readable medium storing a program causing a processor to execute an operation in a system comprising a control device that receives an access request from a host transmitted via one of a plurality of information processing devices, from a management device, and accesses, among a plurality of memories, a memory corresponding to the information processing device via which the access request is transmitted, the operation comprising:

storing correspondence information indicating a correspondence between each of the memories and each of the information processing devices;

detecting a first memory from among the plurality of memories, the first memory being a memory whose access frequency exceeds a predetermined access frequency or is relatively high;

detecting a second memory from among the memories, the second memory being a memory whose access frequency is lower than or equal to a predetermined access frequency;

changing the correspondence information so that an information processing device corresponding to the first memory changes from a first information processing device to a second information processing device corresponding to the second memory; and notifying the management device of the changed correspondence information, and outputting data read from the first memory to the management device via the second information processing device.

* * * * *